US008549513B2

(12) United States Patent
Vinberg et al.

(10) Patent No.: US 8,549,513 B2
(45) Date of Patent: *Oct. 1, 2013

(54) MODEL-BASED VIRTUAL SYSTEM PROVISIONING

(75) Inventors: Anders B. Vinberg, Kirkland, WA (US);
 Robert M. Fries, Redmond, WA (US);
 Kevin Grealish, Seattle, WA (US);
 Galen C. Hunt, Bellevue, WA (US);
 Aamer Hydrie, Seattle, WA (US); Rob Mensching, Redmond, WA (US);
 Geoffrey Outhred, Seattle, WA (US);
 John M. Parchem, Seattle, WA (US);
 Bassam Tabbara, Seattle, WA (US);
 Rene Antonio Vega, Kirkland, WA (US);
 Robert V. Welland, Seattle, WA (US);
 Eric J. Winner, Woodinville, WA (US);
 Jeffrey A. Woolsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/169,973

(22) Filed: Jun. 29, 2005

(65) Prior Publication Data

US 2007/0006218 A1    Jan. 4, 2007

(51) Int. Cl.
 *G06F 9/445* (2006.01)
(52) U.S. Cl.
 USPC .......................................... 717/174; 717/104
(58) Field of Classification Search
 USPC .................................. 717/174–178, 104–108
 See application file for complete search history.

(56) References Cited

U.S. PATENT DOCUMENTS

| 4,200,770 A | 4/1980 | Hellman et al. |
| 4,218,582 A | 8/1980 | Hellman et al. |
| 4,405,829 A | 9/1983 | Rivest et al. |
| 4,424,414 A | 1/1984 | Hellman et al. |
| 5,031,089 A | 7/1991 | Liu et al. |

(Continued)

FOREIGN PATENT DOCUMENTS

| CN | 1368694 | 9/2002 |
| CN | 1375685 | 10/2002 |

(Continued)

OTHER PUBLICATIONS

IBM, "IBM Tivoli Workload Scheduler—Planning and Installation Guide", 2004, IBM, version 8.2, pp. i-xviii, 1-171.*

(Continued)

*Primary Examiner* — Ted T Vo
(74) *Attorney, Agent, or Firm* — Woodcock Washburn, LLP

(57) ABSTRACT

Model-based virtual system provisioning includes accessing a model of a workload to be installed on a virtual machine of a system as well as a model of the system. A workload refers to some computing that is to be performed, and includes an application to be executed to perform the computing, and optionally includes the operating system on which the application is to be installed. The workload model identifies a source of the application and operating system of the workload, as well as constraints of the workload, such as resources and/or other capabilities that the virtual machine(s) on which the workload is to be installed must have. An installation specification for the application is also generated, the installation specification being derived at least in part from the model of the workload and the model of the virtual system.

17 Claims, 6 Drawing Sheets

(56) References Cited

U.S. PATENT DOCUMENTS

| | | |
|---|---|---|
| 5,220,621 A | 6/1993 | Saitoh |
| 5,430,810 A | 7/1995 | Saeki |
| 5,490,276 A | 2/1996 | Doli, Jr. et al. |
| 5,495,610 A | 2/1996 | Shing et al. |
| 5,499,357 A | 3/1996 | Sonty et al. |
| 5,504,921 A | 4/1996 | Dev et al. |
| 5,557,774 A | 9/1996 | Shimabukuro et al. |
| 5,579,482 A | 11/1996 | Einkauf et al. |
| 5,668,995 A | 9/1997 | Bhat |
| 5,686,940 A | 11/1997 | Kuga |
| 5,724,508 A | 3/1998 | Harple, Jr. et al. |
| 5,748,958 A | 5/1998 | Badovinatz et al. |
| 5,758,351 A | 5/1998 | Gibson et al. |
| 5,768,271 A | 6/1998 | Seid et al. |
| 5,774,689 A | 6/1998 | Curtis et al. |
| 5,784,463 A | 7/1998 | Chen et al. |
| 5,790,895 A | 8/1998 | Krontz et al. |
| 5,818,937 A | 10/1998 | Watson et al. |
| 5,822,531 A | 10/1998 | Gorczyca et al. |
| 5,826,015 A | 10/1998 | Schmidt |
| 5,835,777 A * | 11/1998 | Staelin ............ 717/175 |
| 5,845,124 A | 12/1998 | Berman |
| 5,845,277 A | 12/1998 | Pfeil et al. |
| 5,867,706 A | 2/1999 | Martin et al. |
| 5,872,928 A | 2/1999 | Lewis et al. |
| 5,878,220 A | 3/1999 | Olkin et al. |
| 5,895,499 A | 4/1999 | Chu |
| 5,905,728 A | 5/1999 | Han et al. |
| 5,917,730 A | 6/1999 | Rittie et al. |
| 5,930,798 A | 7/1999 | Lawler et al. |
| 5,958,009 A | 9/1999 | Friedrich et al. |
| 5,968,126 A | 10/1999 | Ekstrom et al. |
| 6,035,405 A | 3/2000 | Gage et al. |
| 6,041,054 A | 3/2000 | Westberg |
| 6,047,323 A | 4/2000 | Krause |
| 6,049,528 A | 4/2000 | Hendel et al. |
| 6,052,469 A | 4/2000 | Johnson et al. |
| 6,059,842 A | 5/2000 | Dumarot et al. |
| 6,065,058 A | 5/2000 | Hailpern et al. |
| 6,075,776 A | 6/2000 | Tanimoto et al. |
| 6,076,108 A | 6/2000 | Courts et al. |
| 6,081,826 A | 6/2000 | Masuoka et al. |
| 6,085,238 A | 7/2000 | Yuasa et al. |
| 6,086,618 A | 7/2000 | Al-Hilali et al. |
| 6,108,702 A | 8/2000 | Wood |
| 6,112,243 A | 8/2000 | Downs et al. |
| 6,115,393 A | 9/2000 | Engel et al. |
| 6,118,785 A | 9/2000 | Araujo et al. |
| 6,125,442 A | 9/2000 | Maves et al. |
| 6,125,447 A | 9/2000 | Gong |
| 6,134,594 A | 10/2000 | Helland et al. |
| 6,147,995 A | 11/2000 | Dobbins et al. |
| 6,151,688 A | 11/2000 | Wipfel et al. |
| 6,167,052 A | 12/2000 | McNeill et al. |
| 6,167,383 A | 12/2000 | Henson |
| 6,178,529 B1 | 1/2001 | Short et al. |
| 6,182,275 B1 | 1/2001 | Beelitz et al. |
| 6,185,308 B1 | 2/2001 | Ando et al. |
| 6,192,401 B1 | 2/2001 | Modiri et al. |
| 6,195,091 B1 | 2/2001 | Harple et al. |
| 6,195,355 B1 | 2/2001 | Demizu |
| 6,208,345 B1 | 3/2001 | Sheard et al. |
| 6,208,649 B1 | 3/2001 | Kloth |
| 6,209,099 B1 | 3/2001 | Saunders |
| 6,212,559 B1 | 4/2001 | Bixler et al. |
| 6,226,788 B1 | 5/2001 | Schoening et al. |
| 6,230,312 B1 | 5/2001 | Hunt |
| 6,233,610 B1 | 5/2001 | Hayball et al. |
| 6,236,365 B1 | 5/2001 | LeBlanc et al. |
| 6,236,901 B1 | 5/2001 | Goss |
| 6,237,020 B1 | 5/2001 | Leymann et al. |
| 6,253,230 B1 | 6/2001 | Couland et al. |
| 6,256,773 B1 | 7/2001 | Bowman-Amuah |
| 6,259,448 B1 | 7/2001 | McNally et al. |
| 6,263,089 B1 | 7/2001 | Otsuka et al. |
| 6,266,707 B1 | 7/2001 | Boden et al. |
| 6,269,076 B1 | 7/2001 | Shamir et al. |
| 6,269,079 B1 | 7/2001 | Marin et al. |
| 6,304,972 B1 | 10/2001 | Shavit |
| 6,305,015 B1 | 10/2001 | Akriche et al. |
| 6,311,144 B1 | 10/2001 | Abu El Ata |
| 6,311,270 B1 | 10/2001 | Challener et al. |
| 6,330,605 B1 | 12/2001 | Christensen et al. |
| 6,336,138 B1 | 1/2002 | Caswell et al. |
| 6,338,112 B1 | 1/2002 | Wipfel et al. |
| 6,351,685 B1 | 2/2002 | Dimitri et al. |
| 6,353,861 B1 | 3/2002 | Dolin, Jr. et al. |
| 6,353,898 B1 | 3/2002 | Wipfel et al. |
| 6,360,265 B1 | 3/2002 | Falck et al. |
| 6,367,010 B1 | 4/2002 | Venkatram et al. |
| 6,370,573 B1 | 4/2002 | Bowman-Amuah |
| 6,370,584 B1 | 4/2002 | Bestavros et al. |
| 6,377,996 B1 | 4/2002 | Lumelsky et al. |
| 6,389,464 B1 | 5/2002 | Krishnamurthy et al. |
| 6,393,386 B1 | 5/2002 | Zager et al. |
| 6,393,456 B1 | 5/2002 | Ambler et al. |
| 6,393,474 B1 | 5/2002 | Eichert et al. |
| 6,393,485 B1 | 5/2002 | Chao et al. |
| 6,408,390 B1 | 6/2002 | Saito |
| 6,418,554 B1 | 7/2002 | Delo et al. |
| 6,424,718 B1 | 7/2002 | Holloway |
| 6,424,992 B2 | 7/2002 | Devarakonda et al. |
| 6,427,163 B1 | 7/2002 | Arendt et al. |
| 6,427,171 B1 | 7/2002 | Craft et al. |
| 6,438,100 B1 | 8/2002 | Halpern et al. |
| 6,442,557 B1 | 8/2002 | Buteau et al. |
| 6,442,713 B1 | 8/2002 | Block et al. |
| 6,449,650 B1 | 9/2002 | Westfall et al. |
| 6,457,048 B2 | 9/2002 | Sondur et al. |
| 6,463,536 B2 | 10/2002 | Saito |
| 6,466,985 B1 | 10/2002 | Goyal et al. |
| 6,470,025 B1 | 10/2002 | Wilson et al. |
| 6,470,464 B2 | 10/2002 | Bertram et al. |
| 6,473,791 B1 | 10/2002 | Al-Ghosein et al. |
| 6,480,955 B1 | 11/2002 | DeKoning et al. |
| 6,484,261 B1 | 11/2002 | Wiegel |
| 6,502,131 B1 | 12/2002 | Vaid et al. |
| 6,505,244 B1 | 1/2003 | Natarajan et al. |
| 6,519,615 B1 | 2/2003 | Wollrath et al. |
| 6,529,953 B1 | 3/2003 | Van Renesse |
| 6,539,494 B1 | 3/2003 | Abramson et al. |
| 6,546,423 B1 | 4/2003 | Dutta et al. |
| 6,546,553 B1 | 4/2003 | Hunt |
| 6,549,934 B1 | 4/2003 | Peterson et al. |
| 6,564,261 B1 | 5/2003 | Gudjonsson et al. |
| 6,570,847 B1 | 5/2003 | Hosein |
| 6,570,875 B1 | 5/2003 | Hegde |
| 6,574,195 B2 | 6/2003 | Roberts |
| 6,584,499 B1 | 6/2003 | Jantz et al. |
| 6,587,876 B1 | 7/2003 | Mahon et al. |
| 6,597,956 B1 | 7/2003 | Aziz et al. |
| 6,598,033 B2 | 7/2003 | Ross et al. |
| 6,598,077 B2 | 7/2003 | Primak et al. |
| 6,598,173 B1 | 7/2003 | Sheikh et al. |
| 6,598,223 B1 | 7/2003 | Vrhel, Jr. et al. |
| 6,601,101 B1 | 7/2003 | Lee et al. |
| 6,601,233 B1 | 7/2003 | Underwood |
| 6,606,708 B1 | 8/2003 | Devine et al. |
| 6,609,148 B1 | 8/2003 | Salo et al. |
| 6,609,213 B1 | 8/2003 | Nguyen et al. |
| 6,611,522 B1 | 8/2003 | Zheng et al. |
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,651,240 B1 | 11/2003 | Yamamoto et al. |
| 6,654,782 B1 | 11/2003 | O'Brien et al. |
| 6,654,796 B1 | 11/2003 | Slater et al. |
| 6,665,714 B1 | 12/2003 | Blumenau et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |

| Patent No. | Date | Inventor(s) |
|---|---|---|
| 6,691,148 B1 | 2/2004 | Zinky et al. |
| 6,691,165 B1 | 2/2004 | Bruck et al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |
| 6,738,736 B1 | 5/2004 | Bond |
| 6,741,266 B1 | 5/2004 | Kamiwada et al. |
| 6,742,020 B1 | 5/2004 | Dimitroff et al. |
| 6,748,447 B1 | 6/2004 | Basani et al. |
| 6,754,716 B1 | 6/2004 | Sharma et al. |
| 6,754,816 B1 | 6/2004 | Layton et al. |
| 6,757,744 B1 | 6/2004 | Narisi et al. |
| 6,760,765 B1 | 7/2004 | Asai et al. |
| 6,760,775 B1 | 7/2004 | Anerousis et al. |
| 6,769,008 B1 | 7/2004 | Kumar et al. |
| 6,769,060 B1 | 7/2004 | Dent et al. |
| 6,779,016 B1 | 8/2004 | Aziz et al. |
| 6,782,408 B1 | 8/2004 | Chandra et al. |
| 6,789,090 B1 | 9/2004 | Miyake et al. |
| 6,801,528 B2 | 10/2004 | Nassar |
| 6,801,937 B1 | 10/2004 | Novaes et al. |
| 6,801,949 B1 | 10/2004 | Bruck et al. |
| 6,804,783 B1 | 10/2004 | Wesinger et al. |
| 6,813,778 B1 | 11/2004 | Poli et al. |
| 6,816,897 B2 | 11/2004 | McGuire |
| 6,820,042 B1 | 11/2004 | Cohen et al. |
| 6,820,121 B1 | 11/2004 | Callis et al. |
| 6,823,299 B1 | 11/2004 | Contreras et al. |
| 6,823,373 B1 | 11/2004 | Pancha et al. |
| 6,823,382 B2 | 11/2004 | Stone |
| 6,829,639 B1 | 12/2004 | Lawson et al. |
| 6,829,770 B1 | 12/2004 | Hinson et al. |
| 6,836,750 B2 | 12/2004 | Wong et al. |
| 6,839,348 B2 | 1/2005 | Tang et al. |
| 6,845,160 B1 | 1/2005 | Aoki |
| 6,847,970 B2 | 1/2005 | Keller et al. |
| 6,853,841 B1 | 2/2005 | St. Pierre |
| 6,854,069 B2 | 2/2005 | Kampe et al. |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,879,926 B2 | 4/2005 | Schmit et al. |
| 6,880,002 B2 | 4/2005 | Hirschfeld et al. |
| 6,886,038 B1 | 4/2005 | Tabbara et al. |
| 6,888,807 B2 | 5/2005 | Heller et al. |
| 6,895,534 B2 | 5/2005 | Wong et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,912,568 B1 | 6/2005 | Nishiki et al. |
| 6,912,657 B2 | 6/2005 | Gehrmann |
| 6,915,338 B1 | 7/2005 | Hunt et al. |
| 6,922,791 B2 | 7/2005 | Mashayekhi et al. |
| 6,928,482 B1 | 8/2005 | Ben Nun et al. |
| 6,944,183 B1 | 9/2005 | Iyer et al. |
| 6,944,678 B2 | 9/2005 | Lu et al. |
| 6,944,759 B1 | 9/2005 | Crisan |
| 6,947,987 B2 | 9/2005 | Boland |
| 6,954,930 B2 | 10/2005 | Drake et al. |
| 6,957,186 B1 | 10/2005 | Guheen et al. |
| 6,963,981 B1 | 11/2005 | Bailey et al. |
| 6,968,291 B1 | 11/2005 | Desai |
| 6,968,535 B2 | 11/2005 | Stelting et al. |
| 6,968,550 B2 | 11/2005 | Branson et al. |
| 6,968,551 B2 | 11/2005 | Hediger et al. |
| 6,971,063 B1 | 11/2005 | Rappaport et al. |
| 6,971,072 B1 | 11/2005 | Stein |
| 6,973,620 B2 | 12/2005 | Gusler et al. |
| 6,973,622 B1 | 12/2005 | Rappaport et al. |
| 6,976,079 B1 | 12/2005 | Ferguson et al. |
| 6,976,269 B1 | 12/2005 | Avery, IV et al. |
| 6,978,379 B1 | 12/2005 | Goh et al. |
| 6,983,317 B1 | 1/2006 | Bishop et al. |
| 6,985,956 B2 | 1/2006 | Luke et al. |
| 6,986,135 B2 | 1/2006 | Leathers et al. |
| 6,987,838 B2 | 1/2006 | Winterbottom |
| 6,990,666 B2 | 1/2006 | Hirschfeld et al. |
| 7,003,562 B2 | 2/2006 | Mayer |
| 7,003,574 B1 | 2/2006 | Bahl |
| 7,012,919 B1 | 3/2006 | So et al. |
| 7,013,462 B2 | 3/2006 | Zara et al. |
| 7,016,950 B2 | 3/2006 | Tabbara et al. |
| 7,024,451 B2 | 4/2006 | Jorgenson |
| 7,027,412 B2 | 4/2006 | Miyamoto et al. |
| 7,028,228 B1 | 4/2006 | Lovy et al. |
| 7,032,031 B2 | 4/2006 | Jungck et al. |
| 7,035,786 B1 | 4/2006 | Abu El Ata et al. |
| 7,035,930 B2 | 4/2006 | Graupner et al. |
| 7,043,407 B2 | 5/2006 | Lynch et al. |
| 7,043,545 B2 | 5/2006 | Tabbara et al. |
| 7,046,680 B1 | 5/2006 | McDysan et al. |
| 7,047,279 B1 | 5/2006 | Beams et al. |
| 7,050,961 B1 | 5/2006 | Lee et al. |
| 7,054,943 B1 | 5/2006 | Goldszmidt et al. |
| 7,055,149 B2 | 5/2006 | Birkholz et al. |
| 7,058,704 B1 | 6/2006 | Mangipudi et al. |
| 7,058,826 B2 | 6/2006 | Fung |
| 7,058,858 B2 | 6/2006 | Wong et al. |
| 7,062,718 B2 | 6/2006 | Kodosky et al. |
| 7,069,204 B1 | 6/2006 | Solden et al. |
| 7,069,337 B2 | 6/2006 | Rawlings et al. |
| 7,069,480 B1 | 6/2006 | Lovy et al. |
| 7,069,553 B2 | 6/2006 | Narayanaswamy et al. |
| 7,072,807 B2 | 7/2006 | Brown et al. |
| 7,072,822 B2 | 7/2006 | Humenansky et al. |
| 7,076,552 B2 | 7/2006 | Mandato |
| 7,076,633 B2 | 7/2006 | Tormasov et al. |
| 7,080,143 B2 | 7/2006 | Hunt et al. |
| 7,082,464 B2 | 7/2006 | Hasan et al. |
| 7,089,281 B1 | 8/2006 | Kazemi et al. |
| 7,089,293 B2 | 8/2006 | Grosner et al. |
| 7,089,530 B1 | 8/2006 | Dardinski et al. |
| 7,093,005 B2 | 8/2006 | Patterson |
| 7,093,288 B1 | 8/2006 | Hydrie et al. |
| 7,096,258 B2 | 8/2006 | Hunt et al. |
| 7,099,936 B2 | 8/2006 | Chase et al. |
| 7,103,185 B1 | 9/2006 | Srivastava et al. |
| 7,113,900 B1 | 9/2006 | Hunt et al. |
| 7,117,158 B2 | 10/2006 | Weldon et al. |
| 7,117,261 B2 | 10/2006 | Kryskow, Jr. et al. |
| 7,117,269 B2 | 10/2006 | Lu et al. |
| 7,120,154 B2 | 10/2006 | Bavant et al. |
| 7,120,797 B2 | 10/2006 | Wheeler |
| 7,124,289 B1 | 10/2006 | Suorsa |
| 7,127,625 B2 | 10/2006 | Farkas et al. |
| 7,131,123 B2 | 10/2006 | Suorsa et al. |
| 7,134,011 B2 | 11/2006 | Fung |
| 7,134,122 B1 | 11/2006 | Sero et al. |
| 7,139,930 B2 | 11/2006 | Mashayekhi et al. |
| 7,139,999 B2 | 11/2006 | Bowman-Amuah |
| 7,143,420 B2 | 11/2006 | Radhakrishnan |
| 7,146,353 B2 | 12/2006 | Garg et al. |
| 7,150,015 B2 | 12/2006 | Pace et al. |
| 7,152,109 B2 | 12/2006 | Suorsa et al. |
| 7,152,157 B2 | 12/2006 | Murphy et al. |
| 7,155,380 B2 | 12/2006 | Hunt et al. |
| 7,155,490 B1 | 12/2006 | Maimer et al. |
| 7,162,427 B1 | 1/2007 | Myrick et al. |
| 7,162,509 B2 | 1/2007 | Brown et al. |
| 7,162,634 B2 | 1/2007 | Litwin, Jr. et al. |
| 7,174,379 B2 | 2/2007 | Agarwal et al. |
| 7,181,731 B2 | 2/2007 | Pace et al. |
| 7,188,335 B1 | 3/2007 | Darr et al. |
| 7,188,364 B2 | 3/2007 | Volpano |
| 7,191,344 B2 | 3/2007 | Lin et al. |
| 7,191,429 B2 | 3/2007 | Brassard et al. |
| 7,194,439 B2 | 3/2007 | Kassan et al. |
| 7,194,616 B2 | 3/2007 | Axnix et al. |
| 7,197,418 B2 | 3/2007 | Fuller, III et al. |
| 7,200,530 B2 | 4/2007 | Brown et al. |
| 7,200,665 B2 | 4/2007 | Eshghi et al. |

| | | |
|---|---|---|
| 7,203,911 B2 | 4/2007 | Williams |
| 7,210,143 B2 | 4/2007 | Or et al. |
| 7,213,231 B1 | 5/2007 | Bandhole et al. |
| 7,222,147 B1 | 5/2007 | Black et al. |
| 7,225,441 B2 | 5/2007 | Kozuch et al. |
| 7,231,410 B1 | 6/2007 | Walsh et al. |
| 7,231,430 B1 | 6/2007 | Brownell et al. |
| 7,237,267 B2 | 6/2007 | Rayes et al. |
| 7,254,634 B1 | 8/2007 | Davis et al. |
| 7,257,584 B2 | 8/2007 | Hirschfeld et al. |
| 7,257,817 B2 | 8/2007 | Cabrera et al. |
| 7,272,653 B2 | 9/2007 | Levy-Abegnoli et al. |
| 7,275,156 B2 | 9/2007 | Balfanz et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,305,549 B2 | 12/2007 | Hunt et al. |
| 7,305,556 B2 | 12/2007 | Slick et al. |
| 7,305,561 B2 | 12/2007 | Hunt et al. |
| 7,309,498 B2 | 12/2007 | Belenkaya et al. |
| 7,313,573 B2 | 12/2007 | Leung et al. |
| 7,313,614 B2 | 12/2007 | Considine et al. |
| 7,315,801 B1 | 1/2008 | Dowd et al. |
| 7,318,216 B2 | 1/2008 | Diab |
| 7,333,000 B2 | 2/2008 | Vassallo |
| 7,343,601 B2 | 3/2008 | Azagury et al. |
| 7,349,891 B2 | 3/2008 | Charron et al. |
| 7,350,068 B2 | 3/2008 | Anderson et al. |
| 7,350,186 B2 | 3/2008 | Coleman et al. |
| 7,356,679 B1 * | 4/2008 | Le et al. ............................. 713/1 |
| 7,366,755 B1 | 4/2008 | Cuomo et al. |
| 7,367,028 B2 | 4/2008 | Kodosky et al. |
| 7,370,103 B2 | 5/2008 | Hunt et al. |
| 7,370,323 B2 | 5/2008 | Marinelli et al. |
| 7,376,125 B1 | 5/2008 | Hussain et al. |
| 7,379,982 B2 | 5/2008 | Tabbara |
| 7,383,329 B2 | 6/2008 | Erickson |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,404,175 B2 | 7/2008 | Lee et al. |
| 7,406,517 B2 | 7/2008 | Hunt et al. |
| 7,406,692 B2 | 7/2008 | Halpern et al. |
| 7,409,420 B2 | 8/2008 | Pullara et al. |
| 7,412,502 B2 | 8/2008 | Fearn et al. |
| 7,415,729 B2 | 8/2008 | Ukeda et al. |
| 7,421,505 B2 | 9/2008 | Berg |
| 7,436,965 B2 | 10/2008 | Sherman |
| 7,448,079 B2 | 11/2008 | Tremain |
| 7,461,249 B1 | 12/2008 | Pearson et al. |
| 7,464,147 B1 | 12/2008 | Fakhouri et al. |
| 7,478,381 B2 | 1/2009 | Roberts et al. |
| 7,478,385 B2 | 1/2009 | Sierer et al. |
| 7,480,907 B1 | 1/2009 | Marolia et al. |
| 7,496,911 B2 | 2/2009 | Rowley et al. |
| 7,500,069 B2 | 3/2009 | Hochmuth et al. |
| 7,505,872 B2 | 3/2009 | Keller et al. |
| 7,506,034 B2 | 3/2009 | Coates et al. |
| 7,512,942 B2 | 3/2009 | Brown et al. |
| 7,543,066 B2 | 6/2009 | Colasurdo et al. |
| 7,567,504 B2 | 7/2009 | Darling et al. |
| 7,574,343 B2 | 8/2009 | Hunt et al. |
| 7,590,736 B2 | 9/2009 | Hydrie et al. |
| 7,594,224 B2 | 9/2009 | Patrick et al. |
| 7,603,442 B2 | 10/2009 | Sen |
| 7,606,929 B2 | 10/2009 | Gbadegesin et al. |
| 7,613,822 B2 | 11/2009 | Joy et al. |
| 7,624,086 B2 | 11/2009 | Keith, Jr. |
| 7,630,877 B2 | 12/2009 | Brown et al. |
| 7,636,917 B2 | 12/2009 | Darling et al. |
| 7,653,187 B2 | 1/2010 | Clark et al. |
| 7,669,235 B2 | 2/2010 | Hunt et al. |
| 7,689,676 B2 | 3/2010 | Vinberg et al. |
| 2001/0014158 A1 | 8/2001 | Baltzley |
| 2001/0020228 A1 | 9/2001 | Cantu et al. |
| 2002/0022952 A1 | 2/2002 | Zager et al. |
| 2002/0049573 A1 | 4/2002 | El Ata et al. |
| 2002/0069267 A1 | 6/2002 | Thiele |
| 2002/0075844 A1 | 6/2002 | Hagen |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0131601 A1 | 9/2002 | Ninomiya et al. |
| 2002/0147862 A1 * | 10/2002 | Traut et al. ....................... 710/1 |
| 2002/0152086 A1 | 10/2002 | Smith et al. |
| 2002/0156900 A1 | 10/2002 | Marquette et al. |
| 2002/0171690 A1 | 11/2002 | Fox et al. |
| 2002/0184327 A1 | 12/2002 | Major et al. |
| 2002/0188941 A1 | 12/2002 | Cicciarelli et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0065743 A1 | 4/2003 | Jenny et al. |
| 2003/0126464 A1 | 7/2003 | McDaniel et al. |
| 2003/0138105 A1 | 7/2003 | Challener et al. |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Hinton |
| 2004/0059812 A1 | 3/2004 | Assa |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117476 A1 | 6/2004 | Steele et al. |
| 2004/0160386 A1 | 8/2004 | Michelitsch et al. |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0226010 A1 | 11/2004 | Suorsa |
| 2005/0008001 A1 | 1/2005 | Williams et al. |
| 2005/0021742 A1 | 1/2005 | Yemini et al. |
| 2005/0080811 A1 | 4/2005 | Speeter et al. |
| 2005/0091078 A1 | 4/2005 | Hunt et al. |
| 2005/0091227 A1 | 4/2005 | McCollum et al. |
| 2005/0097082 A1 * | 5/2005 | Yan ................................. 707/3 |
| 2005/0097097 A1 | 5/2005 | Hunt et al. |
| 2005/0097146 A1 | 5/2005 | Konstantinou et al. |
| 2005/0102154 A1 | 5/2005 | Dodd et al. |
| 2005/0102388 A1 | 5/2005 | Tabbara et al. |
| 2005/0102513 A1 | 5/2005 | Alve |
| 2005/0102538 A1 | 5/2005 | Hunt et al. |
| 2005/0125212 A1 | 6/2005 | Hunt et al. |
| 2005/0138416 A1 | 6/2005 | Qian et al. |
| 2005/0152270 A1 | 7/2005 | Gomez Paredes et al. |
| 2005/0192971 A1 | 9/2005 | Tabbara et al. |
| 2005/0193103 A1 | 9/2005 | Drabik |
| 2005/0246529 A1 | 11/2005 | Hunt et al. |
| 2005/0251783 A1 | 11/2005 | Torone et al. |
| 2005/0257244 A1 | 11/2005 | Joly et al. |
| 2005/0268325 A1 | 12/2005 | Kuno et al. |
| 2006/0025984 A1 | 2/2006 | Papaefstathiou et al. |
| 2006/0025985 A1 | 2/2006 | Vinberg et al. |
| 2006/0031248 A1 | 2/2006 | Vinberg et al. |
| 2006/0034263 A1 | 2/2006 | Outhred et al. |
| 2006/0037002 A1 * | 2/2006 | Vinberg et al. ................. 717/124 |
| 2006/0048017 A1 | 3/2006 | Anerousis et al. |
| 2006/0123040 A1 | 6/2006 | McCarthy et al. |
| 2006/0155708 A1 | 7/2006 | Brown et al. |
| 2006/0161879 A1 | 7/2006 | Lubrecht et al. |
| 2006/0161884 A1 | 7/2006 | Lubrecht et al. |
| 2006/0232927 A1 | 10/2006 | Vinberg et al. |
| 2006/0235664 A1 | 10/2006 | Vinberg et al. |
| 2006/0259609 A1 | 11/2006 | Hunt et al. |
| 2006/0259610 A1 | 11/2006 | Hunt et al. |
| 2007/0006177 A1 | 1/2007 | Aiber et al. |
| 2007/0112847 A1 | 5/2007 | Dublish et al. |
| 2007/0192769 A1 | 8/2007 | Mimura et al. |
| 2008/0059214 A1 | 3/2008 | Vinberg et al. |

FOREIGN PATENT DOCUMENTS

| | | |
|---|---|---|
| EP | 0964546 | 12/1999 |
| EP | 1180886 | 2/2002 |

| | | |
|---|---|---|
| EP | 1307018 | 5/2003 |
| EP | 1550969 | 7/2005 |
| JP | 6250956 | 9/1994 |
| JP | 8297567 | 11/1996 |
| JP | 10124343 | 5/1998 |
| JP | 10150470 | 6/1998 |
| JP | 10240576 | 9/1998 |
| JP | 10285216 | 10/1998 |
| JP | 11007407 | 1/1999 |
| JP | 11340980 | 12/1999 |
| JP | 2000293497 | 10/2000 |
| JP | 2001339437 | 12/2001 |
| JP | 2001526814 | 12/2001 |
| JP | 2002084302 | 3/2002 |
| JP | 2002354006 | 12/2002 |
| JP | 2003030424 | 1/2003 |
| JP | 2003532784 | 11/2003 |
| JP | 2005155729 | 6/2005 |
| KR | 10-2002-0026751 | 4/2002 |
| KR | 10-2004-0008275 | 1/2004 |
| RU | 2111625 | 5/1998 |
| RU | 2156546 | 9/2000 |
| RU | 2189072 | 9/2002 |
| WO | WO 97/28505 | 8/1997 |
| WO | WO 98/53410 | 11/1998 |
| WO | WO 99/30514 | 6/1999 |
| WO | WO 99/63439 | 12/1999 |
| WO | WO 00/22526 | 4/2000 |
| WO | WO 00/31945 | 6/2000 |
| WO | WO0073929 | 12/2000 |
| WO | WO 01/14733 | 11/2001 |
| WO | WO 01/85881 | 11/2001 |
| WO | WO 02/30044 | 4/2002 |
| WO | WO 02/37748 | 5/2002 |
| WO | WO 02/085051 | 10/2002 |
| WO | WO 03/027876 | 12/2002 |
| WO | WO 03/039104 | 5/2003 |

OTHER PUBLICATIONS

Sapuntzakis et al., "Optimizing the Migration of Virtual Computers", 2002, USENIX Association, pp. 377-390.*
Lin et al., "User-driven Scheduling of Interactive Virtual Machines", Oct. 2004, IEEE, 8 pages.*
Chen, et al., "Performance Prediction of Component-based Applications", Journal of Systems and Software, vol. 74, Issue 1, Jan. 2005, pp. 1-12.
Dekhil, et al., "Generalized Policy Model for Application and Service Management", Hewlett-Packard Laboratories, 1999, 3 pages.
Garschhammer, et al., "Towards Generic Service Management Concepts a Service Model Based Approach", IEEE/IFIP International Symposium, Integrated Network Management Proceedings, 2001,14 pages.
Harbour, et al., "MAST: An Open Environment for Modeling, Analysis, and Design of Real-Time Systems", 2001, pp. 1-16.
Hardwick, et al., "Modeling the Performance of E-Commerce Site", Journal of Computer Resource Management, 2002, 11 pages.
"Integrated Security Management", OpenPMF (Policy Management Framework), retrieved as early as Apr. 23, 2007 from <<http://www.objectsecurity.com/doc/openpmf-A4.pdf>>, 2 pages.
Kounev, "A Capacity Planning Methodology for Distributed E-Commerce Applications", Jan. 2, 2001, pp. 1-13.
Mahon, "OpenView PolicyXpert: Heterogeneous Configuration and Control", OpenView Policy-Based Network Management, Feb. 1999, pp. 1-4.
Norton, "Simalytic Hybrid Modeling Planning the Capacity of Client/Server Applications", Colorado Technical University, Aug. 24-29, 1997, pp. 1-7.
Selic, "A Generic Framework for Modeling Resources with UML", IEEE, vol. 33, Issue 6, Jun. 2000, pp. 64-69.
Chunxiao, et al., Configure and move the e-Commerce Business Model by Utilizing XML, Applications of Computer Systems, No. 2, p. 8-11.
Yuhui, e-Commerce Based on ERP for Enterprize by Utilizing DNA and XML, Computer Engineering, vol. 27, No. 6, p. 165,166,182.
U.S. Appl. No. 11/427,041, filed Jun. 28, 2006, Vinberg et al.

Araki, "Linux Security Diary, Use VLAN in Linux," Linux Japan, Itsutsubashi Research Co., Ltd., Nov. 1, 2008, 3(11), 110-113, (CSDB: National Academy Paper 200300158009).
Barrett et al., "Model driven distribution pattern design for dynamic web services compositions," ACM ICWE, 2006, 129-136.
Cardelli, L., "Type Systems," CRC Handbook of Computer Science and Engineering, 2nd Edition, Ch. 97, Wednesday, Feb. 25, 2004, 8:00pm CRC Press, http://research.microsoft.com/Users.Iuca/Papers/TypeSystems.pdf.
Chen, et al., "Performance Prediction of Component-based Application", Journal of Systems and Software, vol. 74, Issue 1, Jan. 2005, pp. 1-12.
Chunxiao et al., "Configure and Move the e-Commerce Business Model by Utilizing XML," Applications of Computer Systems, Feb. 28, 2002, No. 2, 8-11.
Chunxiao et al., "Using XML Schema to Configure Mobile E-Commerce Transaction Model," Applications of Computer Systems, Feb. 28, 2002, No. 2, 9 pages.
"Enhanced IP Services for Cisco Networks," retrieved on Jun. 19, 2007, at <<http://proquest.safaribooksonline.com/1578701066>>, Sep. 23, 1999, 11 pages.
China Office Action from corresponding Chinese Patent Application No. 200410088250.0 dated Apr. 27, 2007, 3 pages.
"C.O.B.A.S. Centralized Out-Of-Band Authentication System," QT Wordtel Inc., Southeast Europe Cybersecurity Conference, Sophia, Bulgaria, Sep. 8-9, 2003.
Dolstra et al., "Imposing a memory management discipline on software deployment," IEEE ICSE, 2004, 1-10.
EPO Communication with Search Report dated Sep. 1, 2006, from counterpart EP Patent Application No. 04005431.4, 3 pages.
Frolund et al., "Design-Time Simulation of a Large-Scale, Distributed Object System" ACM, Oct. 1998, 8(4), 374-400.
Heilala et al., "Modeling and simulation for customer driven manufacturing system design and operation planning", IEEE, 2007, 1853-1862.
Heinl et al., "A Comprehensive Approach to Flexibility in Workflow Management Systems," WACC '99, ACM, Feb. 1999, 79-88.
Howard et al., "Designing Secure Web-Based Applications for Microsoft Windows 2000", 2000.
Iwasaki, H., "IP Troubles Q&A—The Prevention of Network Troubles and the Risk Management," Computer & Network LAN, Japan Ohmsha, Ltd., Jul. 14, 2000, 18(8), 29-39.
Translated the Japanese Office Action mailed Jan. 26, 2007 for the Japanese Patent Application No. 2001-326848, a counterpart foreign application of US Patent No. 6,886,038.
Translated the Japanese Office Action mailed Dec. 14, 2007 for the Japanese Patent Application No. 2001-326848, a counterpart foreign application of US Patent No. 6,886,038.
Office Action from the Patent Office of the State Intellectual Property Office of the People's Republic of China, Application No. 200410033027.7, mailed Feb. 2, 2007, 23 pages.
Translated the Japanese Office Action for Japanese Patent Application No. 2004-061396, mailed on Jun. 24, 2008, 27 pages.
Kitjongthawonkul, S. et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.
Lee et al., "Community Services: A Toolkit for Rapid Deployment of Network Services," Proceedings of the IEEE International Conference on Cluster Computing, IEEE, 2002, 4 pages.
Levillain et al., "Switch-Based Server Load Balancing for Enterprises," Alcatel Telecommunications Review, 2002, No. 4, 298-302.
Liu et al., "Visualization in Network Topology Optimization", ACM, 1992, 50-56.
Meader, P., "Build Distributed Apps a New Way," VSLive!ShowDaily, San Francisco, Mar. 25, 2004, http://www.ftponline.com/reports/vslivesf/2004/whitehorse2/.
Meader, P., "Model Apps More Effectively," VSLive!ShowDaily, San Francisco, Mar. 24, 2004, http://www.ftponline.com/reports/vslivesf/2004/whitehorse/.
Meli, "Measuring Change Requests to Support Effective Project Management Practices," Proc. of the ESCOM 2001, London, Apr. 2001, 25-34.

Menezes et al., "Handbook of Applied Cryptography," CRC Press, 1996, *Chs*. 8 & 12, 283-319 and 489-541.

"Remote Operating System Installation," retrieved on Feb. 13, 2009 at <<http://technet.microsoft.com/en-us/library/bb742501.aspx>>, Microsoft TechNet, Sep. 9, 1999, 1-28.

Microsoft.com, "System Definition Model," retrieved at <<http://web.archive.org/web/20040405230803/www.microsoft.com/windowsserversystem/dsi/sdm.mspx>>, Published Dec. 15, 2003 and updated Mar. 31, 2004, 4 pages.

Miyamoto, et al., "VLAN Management System of Large-scale Network," *Journal of Information Processing Society of Japan*, Dec. 15, 2000, 41(12), 3234-3244 (CSDB: National Academy Paper 200200108005).

Morimoto et al., "Compatability Testing for Windows Server 2003", *Microsoft Windows Server 2003 Unleashed*, Chapter 18, Section 1, Jun. 14, 2004, 2 pages.

Nerurkar, "Security Analysis and Design", *Dr. Dobb's Journal*, Nov. 2000, 50-56.

Nestor, "Security Modeling Using Hierarchical State Machines", *IEEE*, 1991, 110-119.

"The Age Changed by Information Network and System: The Internet Releasing Enterprises and Society A? The New Century created by an E Service and a Terabit Network Service: Disappearance of Enterprise Servers, Service Components Behind the Internet," Nikkei Internet Technology, Japan, Nikkei Business Publications, Inc., Dec. 22, 1999, No. 30, 76-81.

PCT International Search Report and Written Opinion for PCT Application No. PCT/US2006/038856, mailed Feb. 20, 2007, 9 pages.

Shi et al., "An Effective Model for Composition of Secure Systems", *J. of Systems and Software*, 1998, 233-244.

Somers, "Hybrid: Unifying Centralised and Distributed Network Management using Intelligent Agents" *IEEE Network Operations and Management Symposium*, Kyoto, Apr. 15-19, 1996, 34-43.

Sultan et al., "Migratory TCP: Connection Migration for Service Continuity in the Internet" *Proceedings 22nd Intl. Conference on Distributed Computing Systems*; Jul. 2002, 469-470.

Tofts, C., "HOLOS—A Stimulation and Multi Mathematical Modelling Tool," Hewlett-Packard Company, 2001, http://www.hpf.hp.com/techreports/2001/HPL-2001-276.pdf.

Wang, W-C, "How a SCVP client authenticates the SCVP server", Online! Sep. 12, 2003, Retrieved from the Internet: URL: http://www.imc.org/ietf-pkix/old-archive-03/msg01323.html].

"Pretty Good Privacy PGP for Personal Privacy, Version 5.0 for Windows 95 Windows NT", Pretty Good Privacy Inc., 1997, 137.

Yamasaki et al., "Model based resources selection for efficient virtual cluster deployment," *ACM VTDC*, 2007, 1-7.

Yuhui, "e-Commerce Based on ERP for Enterprize by Utilizing DNA and XML," *Computer Engineering*, Jun. 2001, 27(6), 165, 166, 182.

W3C: "Resource Description Framework (RDF), Concepts and Abstract Syntax", http://www.w3.org/TR2004/REC-rdf-concepts-20040210, Feb. 10, 2004, XP002570908.

\* cited by examiner

MODEL-BASED VIRTUAL SYSTEM PROVISIONING

BACKGROUND

Computers have become increasingly commonplace in our world and offer a variety of different functionality. Some computers are designed primarily for individual use, while others are designed primarily to be accessed by multiple users and/or multiple other computers concurrently. These different functionalities are realized by the use of different hardware components as well as different software applications that are installed on the computers.

Although the variety of available computer functionality and software applications is a tremendous benefit to the end users of the computers, such a wide variety can be problematic for the developers of the software applications as well as system administrators that are tasked with keeping computers running. Such problems can arise, for example, because of differences in configurations or settings that are required by different software applications that a user may try to install on the same computer. Situations can arise where the settings required by one software application cause another software application to malfunction. By way of another example, situations can arise where two software applications have conflicting requirements on how the operating system on the computer should be configured. Such situations can cause one or both of the software applications, and possibly additional applications, to operate incorrectly if both are installed concurrently.

Accordingly, there is a need for an improved way to install software applications on computers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Model-based virtual system provisioning is described herein.

In accordance with certain aspects, a model of a workload to be installed on a virtual machine of a system as well as a model of the system are accessed. A workload refers to some computing that is to be performed, and includes an application to be executed to perform the computing, and optionally includes the operating system on which the application is to be installed. The workload model identifies a source of the application and operating system of the workload, as well as constraints of the workload, such as resources and/or other capabilities that the virtual machine(s) on which the workload is to be installed must have. An installation specification for the application is also generated, the installation specification being derived at least in part from the model of the workload and the model of the virtual system.

BRIEF DESCRIPTION OF THE DRAWINGS

The same numbers are used throughout the drawings to reference like features.

DETAILED DESCRIPTION

Figure 1:
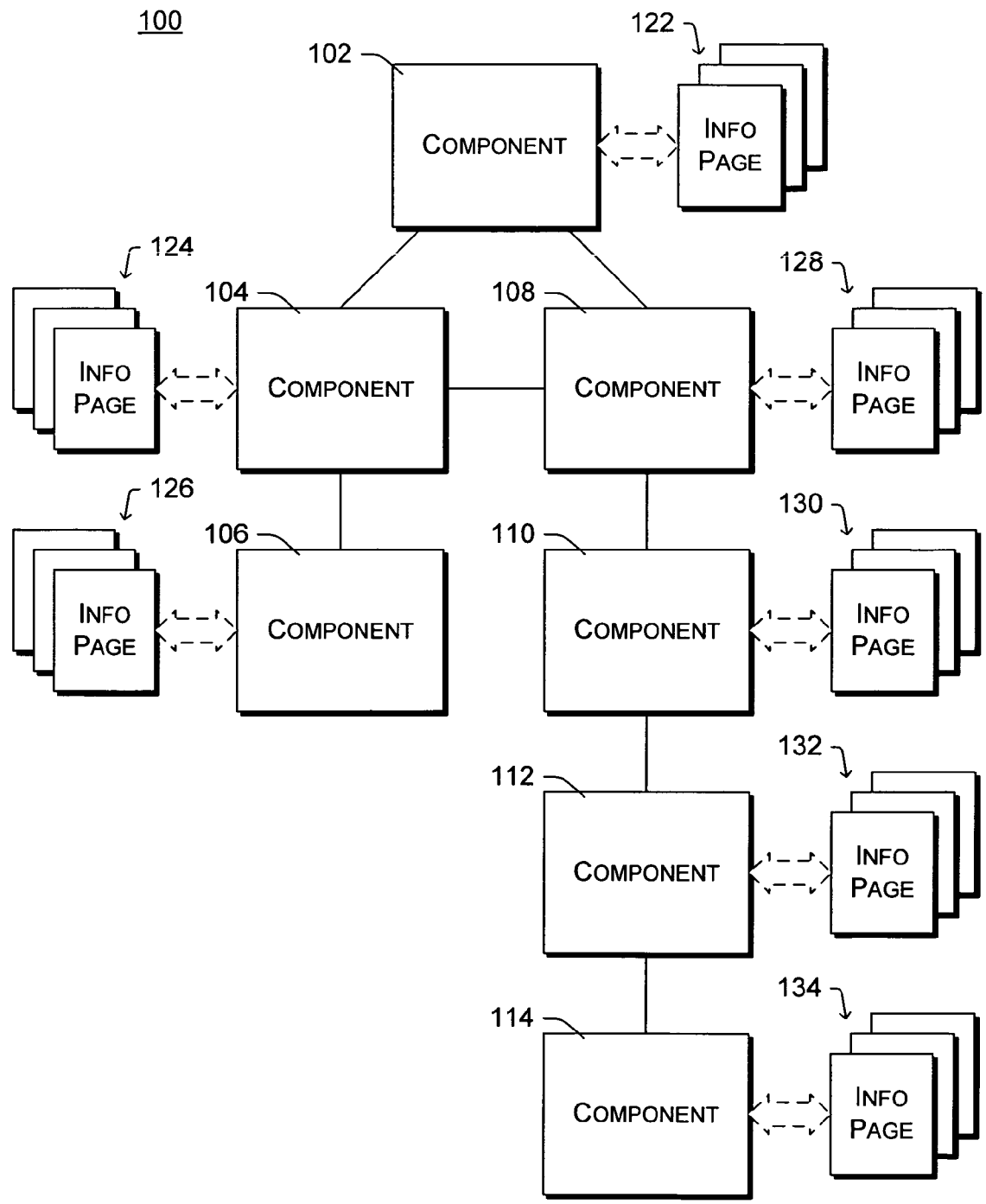
FIG. 1 illustrates an example system definition model (SDM) that can be used with the model-based virtual system provisioning described herein.

Model-based virtual system provisioning is described herein. An installation specification for provisioning a computing device(s) is generated and subsequently used to provision the computing device(s). The installation specification describes how to install a workload on the computing device(s), the workload referring to some computing that is to be performed. The workload is installed on a virtual machine of the computing device(s), which is typically created as part of the installation process. The installation specification is derived at least in part from a model of the workload to be installed on the computing device(s) and a model of the system in which the application is to be installed (the system including the computing device(s)).

As used herein, an application refers to a collection of instructions that can be executed by a processor, such as a central processing unit (CPU) of a computing device. An application can be any of a variety of different types of software or firmware, or portions thereof. Examples of applications include programs that run on an operating system, the operating system, operating system components, services, infrastructure, middleware, portions of any of these, and so forth.

A system definition model (SDM) describes a system that can be managed. Management of a system can include, for example, installing software on the system, monitoring the performance of the system, maintaining configuration information about the system, verifying that constraints within the system are satisfied, combinations thereof, and so forth. A system can be, for example, an application, a single computing device, multiple computing devices networked together (e.g., via a private or personal network such as a local area network (LAN) or via a larger network such as the Internet), and so forth.

The systems discussed herein can be virtual systems that include one or more virtual machines. A virtual machine can be thought of as a computing device implemented in software. A virtual machine typically emulates a computing device, including all of the hardware components of a computing device, although in some cases the physical devices may be assigned directly to a virtual machine without emulation. A virtual machine runs on a computing device in its own isolated and self-contained environment, having its own operating system and optionally other software installed on it. Multiple virtual machines can be run on the same computing device, each of the multiple virtual machines having its own isolated environment and its own operating system installed thereon. A virtual system includes one or more computing devices that run a virtual machine. A virtual system can include one or more computing devices that already run a virtual machine and/or one or more computing devices that are to have a virtual machine provisioned thereon. A virtual machine can be provisioned on a computing device as part of the virtual system provisioning described herein.

In addition to conventional virtual machines, other forms of containers for workloads are being contemplated or implemented in the industry, such as "sandboxes" that allow a workload to run within an operating system that is shared with other workloads but which nonetheless provide the workloads more isolation than if the workloads were running directly in the operating system. These different containers can be viewed as "lightweight" virtual machines, in the sense that they provide many of the same benefits as traditional virtual machines with less cost or operational overhead. The techniques described herein can be used for such containers as well as traditional virtual systems, and references to virtual machines herein include such other forms of containers.

FIG. 1 illustrates an example SDM 100 that can be used with the model-based virtual system provisioning described herein. SDM 100 includes a component corresponding to each of one or more software and/or hardware components being managed in a virtual system. These software and/or hardware components being managed refer to those software and/or hardware components that the author of SDM 100 and/or designers of the system desires to include in SDM 100. Examples of hardware and/or software components that could be in a system include an application (such as a database application, email application, file server application, game, productivity application, operating system, and so forth), particular hardware on a computer (such as a network card, a hard disk drive, one of multiple processors, and so forth), a virtual machine, a computer, a group of multiple computers, and so on. A system refers to a collection of one or more hardware and/or software components.

SDM 100 represents a system including component 102, component 104, component 106, component 108, component 110, component 112, and component 114. Although the example SDM 100 includes seven components, in practice a system, and thus the SDM, can include any number of components.

For example, component 106 could represent a particular computer, while component 104 represents an operating system running on that particular computer. By way of another example, component 106 could represent an operating system, while component 104 represents a database application running on the operating system. By way of yet another example, component 114 could represent a particular computer, while component 112 represents an operating system installed on that particular computer, component 110 represents a virtual machine running on the operating system, and component 108 represents an operating system running on the virtual machine. Note that the operating systems associated with component 112 and component 108 could be the same or alternatively two different operating systems.

The SDM is intended to be a comprehensive knowledge store, containing all information used in managing the system. This information includes information regarding the particular components in the system, as well as relationships among the various components in the system. Despite this intent, it is to be appreciated that the SDM may contain only some of the information used in managing the system rather than all of the information.

Relationships can exist between different components in a system, and these relationships are typically illustrated in SDM diagrams with lines connecting the related components. Examples of relationships that can exist between components include containment relationships, hosting relationships, and communication relationships. Containment relationships identify one component as being contained by another component—data and definitions of the component being contained are incorporated into the containing component. When a component is installed on a system, any components contained in that component are also typically installed on the system. In FIG. 1, containment relationships are illustrated by the diagonal lines connecting component 102 and component 104, and connecting component 102 and component 108.

Hosting relationships identify dependencies among components. In a hosting relationship, the hosting component typically must be present in order for the guest component to be included in the system. In FIG. 1, hosting relationships are illustrated by the vertical lines connecting component 104 and component 106, connecting component 108 and component 110, connecting component 110 and 112, and connecting component 112 and 114.

Communication relationships identify components that can communicate with one another. Communication relationships may or may not imply that a dependency exists between the components. In FIG. 1, communication relationships are illustrated by the horizontal line connecting component 104 and component 108.

Associated with each component in SDM 100 is one or more information (info) pages. Information pages 122 are associated with component 102, information pages 124 are associated with component 104, information pages 126 are associated with component 106, information pages 128 are associated with component 108, information pages 130 are associated with component 110, information pages 132 are associated with component 112, and information pages 134 are associated with component 114. Each information page contains information about the associated component. Different types of information can be maintained for different components. One or more information pages can be associated with each component in SDM 100, and the particular information that is included in a particular information page can vary in different implementations. All the information can be included on a single information page, or alternatively different pieces of information can be grouped together in any desired manner and included on different pages. In certain embodiments, different pages contain different types of information, such as one page containing installation information and another page containing constraint information. Alternatively, different types of information may be included on the same page, such as installation information and constraint information being included on the same page.

Examples of types of information pages include installation pages, constraint pages, monitoring pages, service level agreement pages, description pages, and so forth. Installation pages include information describing how to install the associated component onto another component (e.g., install an application onto a computer), such as what files to copy onto a hard drive, what system settings need to be added or changed (such as data to include in an operating system registry), what configuration programs to run after files are copied onto the hard drive, sequencing specifications that identify that a particular installation or configuration step of one component should be completed before an installation or configuration step of another component, and so forth.

Constraint pages include information describing constraints for the associated component, including constraints to be imposed on the associated component, as well as constraints to be imposed on the system in which the associated component is being used (or is to be used). Constraints imposed on the associated component are settings that the component should have (or alternatively should not have) when the component is installed into a system. Constraints imposed on the system are settings (or other configuration items, such as the existence of another application or a piece of hardware) that the system should have (or alternatively should not have) in order for the associated component to be used in that particular system.

It should also be noted that constraints can flow across relationships. For example, constraints can identify settings that any component that is contained by the component, or that any component that contains the component, should have (or alternatively should not have). By way of another example, constraints can identify settings that any component that is hosted by the component, or that any component that hosts the component, should have (or alternatively should not have). By way of yet another example, constraints can identify settings that any component that communicates with the component should have (or alternatively should not have).

In addition, constraint pages may also include a description of how particular settings (or components) are to be discovered. For example, if a constraint indicates that an application should not co-exist with Microsoft® SQL Server, then the constraint page could also include a description of how to discover whether Microsoft® SQL Server is installed in the system. By way of another example, if a constraint indicates that available physical memory should exceed a certain threshold, then the constraint page could also include a description of how to discover the amount of available physical memory in the system. By way of still another example, if a constraint indicates that a security setting for Microsoft® SQL Server should have a particular value, then the constraint page could also include a description of how to discover the value of that security setting for Microsoft® SQL Server.

Constraint pages may also include a description of how particular settings are to be modified if they are discovered to not be in compliance with the constraints. Alternatively, the constraint pages could include specifications of some other action(s) to take if particular settings are discovered to not be in compliance with the constraints, such as sending an event into the system's event log, alerting an operator, starting a software application to take some corrective action, and so forth. Alternatively, the constraint pages could include a policy that describes what action to take under various circumstances, such as depending on the time of day, depending on the location of the system.

Constraint pages may also optionally include default values for at least some of these settings, identifying a default value to use within a range of values that satisfy the constraint. These default values can be used to assist in installation of an application, as discussed in more detail below.

Monitoring pages include information related to monitoring the performance and/or health of the associated component. This information can include rules describing how the associated component is to be monitored (e.g., what events or other criteria to look for when monitoring the component), as well as what actions to take when a particular rule is satisfied (e.g., record certain settings or what events occurred, sound an alarm, etc.).

Service level agreement pages include information describing agreements between two or more parties regarding the associated component (e.g., between the purchaser of the associated component and the seller from which the associated component was purchased). These can be accessed during operation of the system to determine, for example, whether the agreement reached between the two or more parties is being met by the parties.

Description pages include information describing the associated component, such as various settings for the component, or other characteristics of the component. These settings or characteristics can include a name or other identifier of the component, the manufacturer of the component, when the component was installed or manufactured, performance characteristics of the component, and so forth. For example, a description page associated with a component that represents a computing device may include information about the amount of memory installed in the computing device, a description page associated with a component that represents a processor may include information about the speed of the processor, a description page associated with a component that represents a hard drive may include information about the storage capacity of the hard drive and the speed of the hard drive, and so forth.

As can be seen in FIG. 1, an SDM maintains various information (e.g., installation, constraints, monitoring, etc.) regarding each component in the system. Despite the varied nature of these information pages, they are maintained together in the SDM and thus can all be readily accessed by various utilities or other applications involved in the management of the system.

An SDM can be generated and stored in any of a variety of different ways and using any of a variety of different data structures. For example, the SDM may be stored in a database. By way of another example, the SDM may be stored in a file or set of multiple files, the files being encoded in XML (Extensible Markup Language) or alternatively some other form. By way of yet another example, the SDM may not be explicitly stored, but constructed each time it is needed. The SDM could be constructed as needed from information existing in other forms, such as installation specifications.

In certain embodiments, the SDM is based on a data structure format including types, instances, and optionally configurations. Each component in the SDM corresponds to or is associated with a type, an instance, and possibly one or more configurations. Additionally, each type, instance, and configuration corresponding to a particular component can have its own information page(s). A type refers to a general template having corresponding information pages that describe the component generally. Typically, each different version of a component will correspond to its own type (e.g., version 1.0 of a software component would correspond to one type, while version 1.1 of that software component would correspond to another type). A configuration refers to a more specific template that can include more specific information for a particular class of the type. An instance refers to a specific occurrence of a type or configuration, and corresponds to an actual physical component (software, hardware, firmware, etc.).

For types, configurations, and instances associated with a component, information contained in information pages associated with an instance can be more specific or restrictive than, but generally cannot contradict or be broader than, the information contained in information pages associated with the type or the configuration. Similarly, information contained in information pages associated with a configuration can be more specific or restrictive than, but cannot contradict or be broader than, the information contained in information pages associated with the type. For example, if a constraint page associated with a type defines a range of values for a buffer size, the constraint page associated with the configuration or the instance could define a smaller range of values within that range of values, but could not define a range that exceeds that range of values.

It should be noted, however, that in certain circumstances a model of an existing system as deployed (that is, a particular instance of a system) may violate the information contained in information pages associated with the type for that existing system. This situation can arise, for example, where the system was deployed prior to an SDM for the system being created, or where a user (such as a system administrator) may have intentionally deployed the system in noncompliance with the information contained in information pages associated with the type for that existing system.

Figure 2:
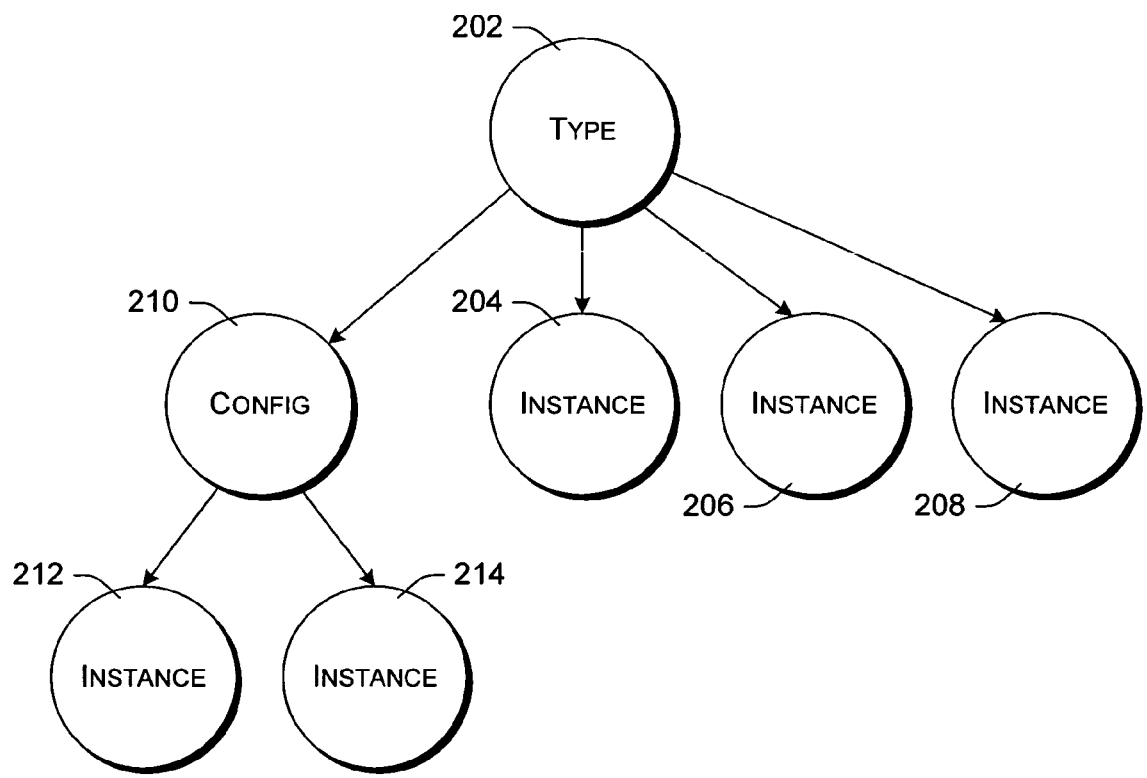
FIG. 2 illustrates an example use of types, configurations, and instances.

The use of types, configurations, and instances is illustrated in FIG. 2. In FIG. 2, a type 202 corresponds to a particular component. Three different instances 204, 206, and 208 of that particular component exist and are based on type 202. Additionally, a configuration (config) 210 exists which includes additional information for a particular class of the particular component, and two instances 212 and 214 of that particular class of the particular component.

For example, assume that a particular component is a database application. A type 202 corresponding to the database application is created, having an associated constraint information page. The constraint information page includes various general constraints for the database application. For example, one of the constraints may be a range of values that a particular buffer size should be within for the database application. Type 202 corresponds to the database application in general.

Each of the instances 204, 206, and 208 corresponds to a different example of the database application. Each of the instances 204, 206, and 208 is an actual database application, and can have its own associated information pages. For example, each instance could have its own associated description information page that could include a unique identifier of the particular associated database application. By way of another example, the constraint information page associated with each instance could include a smaller range of values for the buffer size than is indicated in the constraint information page associated with type 202.

The information pages corresponding to the instances in FIG. 2 can be in addition to, or alternatively in place of, the information pages corresponding to the type. For example, two constraint information pages may be associated with each instance 204, 206, and 208, the first constraint information page being a copy of the constraint information page associated with type 202 and the second constraint information page being the constraint information page associated with the particular instance and including constraints for just that instance. Alternatively, a single constraint information page may be associated with each instance 204, 206, and 208, the single constraint information page including the information from the constraint information page associated with type 202 as well as information specific to the particular instance. For example, the range of values that the particular buffer size should be within for the database application would be copied from the constraint information page associated with type 202 to the constraint information page associated with each instance. However, if the constraint information page for the instance indicated a different range of values for that particular buffer size, then that different range of values would remain in the constraint information page associated with the instance rather than copying the range of values from the constraint information page associated with type 202.

Following this example of a database application, configuration 210 corresponds to a particular class of the database application. For example, different classes of the database application may be defined based on the type of hardware the application is to be installed on, such as different settings based on whether the computer on which the database application is to be installed is publicly accessible (e.g., accessible via the Internet), or based on whether an operating system is already installed on the server. These different settings are included in the constraint information page associated with configuration 210.

Each of the instances 212 and 214 corresponds to a different example of the database application. Similar to instances 204, 206, and 208, each of instances 212 and 214 is an actual database application, and can have its own information page(s). However, unlike instances 204, 206, and 208, the constraint information pages associated with instances 212 and 214 each include the constraints that are in the constraint information page associated with configuration 210 as well as the constraints in the constraint information page associated with type 202.

It should be noted that, although the information pages are discussed as being separate from the components in the SDM, the data structure(s) implementing the SDM could alternatively include the information discussed as being included in the various information pages. Thus, the component data structures themselves could include the information discussed as being included in the various information pages rather than having separate information pages.

The installation page associated with a component can be used as a basis for provisioning a virtual system. Provisioning a virtual system refers to installing a workload on the virtual system, as well as making any necessary changes to the virtual system in order for the workload to be installed. Such necessary changes typically include creating a new virtual machine, and can also include other actions, such as installing an operating system on the computing device on which the new virtual machine runs or installing an operating system on the newly created virtual machine, setting configuration values for the operating system, installing one or more other applications, configuring a storage system to be accessible to the virtual machine, configuring networks to be accessible to the virtual machine, and so forth. In certain implementations, the workload is installed by creating a new virtual machine on a computing device and copying an image file to the storage device of the computing device. This image file includes an application(s) to be run to perform the computing of the workload, and also typically includes the operating system on which the application(s) is to be run.

In the discussions herein, reference is made to different classes of computing devices. Each of these different classes of computing devices refers to computing devices having particular common characteristics, so they are grouped together and viewed as a class of devices. Examples of different classes of devices include IIS (Internet Information Services) servers that are accessible to the Internet, IIS servers that are accessible only on an internal intranet, database servers, email servers, order processing servers, desktop computers, and so forth. Typically, each different class of computing device corresponds to one of the configurations in the system model.

These different classes of computing devices can be different classes of physical devices, as well as different classes of virtual machines. The classes may distinguish between virtual machine classes and physical device classes. For example, one class may be database virtual machines, another class may be database physical servers (not running the database on a virtual machine), another class may be an order processing virtual machine, another class may be an order processing physical server (not running the order processing application(s) on a virtual machine), and so forth. Alternatively, the classes may not distinguish between virtual machine classes and physical device classes. For example, a single database server class may be used for database servers regardless of whether the database application(s) are run on a virtual machine or a computing device without a virtual machine(s).

Provisioning of virtual systems is based in part on workloads. Generally, a workload is some computing that is to be performed. A workload typically includes an application to be executed to perform the computing, and can also include the operating system on which the application is to be installed. Various configuration information describing how the application and/or operating system is to be configured, as well as data to be used by the application and/or operating system when executing, can also be included in the workload. A model of the workload includes the application, operating system, configuration information, and/or data, as well as constraints of the workload such as resources and/or other capabilities that the virtual machine(s) on which the workload is to be installed must have. Examples of these constraints are discussed below.

Figure 3:
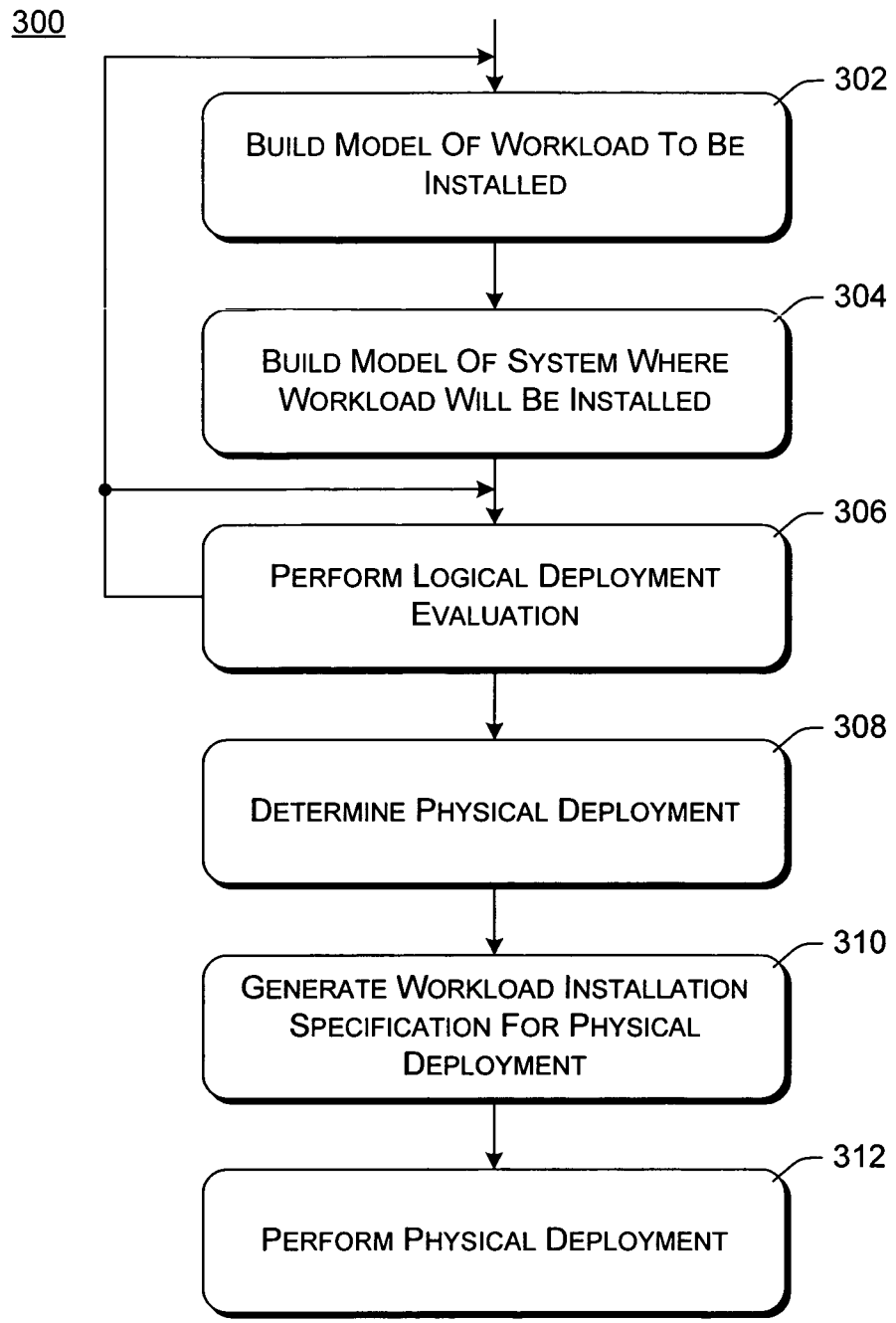
FIG. 3 is a flowchart illustrating an example process for provisioning a virtual system.

FIG. 3 is a flowchart illustrating an example process 300 for provisioning a virtual system. Portions of process 300 can be implemented in software, firmware, and/or hardware.

Initially, a model of a workload is built (act 302). As discussed above, the workload typically includes the application to be installed on a virtual system, and can also include the operating system, configuration information, and/or data. Alternatively, the workload may not include an application, but may include an operating system (or components of an operating system), configuration information, and/or data. The model of the workload can also include one or more constraints.

This building process in act 302 is typically performed by the developer of the workload, although could alternatively be performed by others. This model is an SDM model of the workload, analogous to model 100 of FIG. 1, and includes one or more components. The model of the workload includes types and optionally configurations. As part of the building process in act 302, zero or more information pages are associated with each component in the model. Typically, at least a constraint information page is associated with each component in the model.

As part of the building process in act 302, types and optionally configurations are defined, along with associated information page(s). The types and configurations can be standard types or configurations that are copied or modified in act 302, or alternatively can be newly created in act 302. As discussed above, different constraints can be included in the configuration information page associated with the type and the configuration information page associated with the configuration. The specific constraints included in the configuration information page for a particular workload can vary based on the particular computing to be performed and/or the desires of the designer of the workload.

The constraints included on a constraint information page can take a variety of forms, such as: hardware requirements regarding the computing device(s) or other hardware on which the application is to be installed (e.g., a minimum processor speed, a minimum amount of memory, a minimum amount of free hard drive space, a minimum amount of network bandwidth available, particular security mechanisms available, and so forth), software requirements regarding the computing device(s) or other hardware or software on which the workload is to be installed (e.g., a particular operating system that should already be installed on the computing device(s), one or more other applications that should already be installed on the computing device(s), specifications regarding how particular hardware and/or the operating system is to be configured such as particular settings for the operating system that should already be made, a particular type of security or encryption that should be in use, and so forth, requirements regarding a virtual machine that should be created on a computing device as well as requirements regarding an operating system that should be installed on the virtual machine before the application can be installed thereon, other requirements regarding the computing device(s) on which the workload is to be installed (e.g., particular security keys available, data center policies that should be enforced, authentication that is used, system topology, etc.), and so on.

Constraints can be positive requirements specifying that something should be present (e.g., the processor should have at least a minimum processor speed, or the Windows® XP operating system should already be installed on the computing device). Constraints can also be negative requirements specifying that something should not be present (e.g., one or more particular applications should not already be installed on the computing device, or particular operating system settings should not be present).

One example constraint of the workload is a number and/or size of CPUs that the system on which the workload is to be installed must have. This constraint can identify a specific number of CPUs that the system must have (e.g., 1 CPU, 2 CPUs, 4 CPUs, etc.), or a range of CPUs that the system must have (e.g., 2 to 4 CPUs). The constraint can also specify the size of the CPUs that are needed, referring to the fraction of a CPU that is needed (e.g., a workload may require 100% of 1 CPU, or 50% of each of 2 CPUs). Both requirements and recommendations can be specified (e.g., a minimum of 2 CPUs is required, but 4 or more CPUs should be used if possible).

Another example constraint of the workload is an amount of memory (e.g., RAM). This constraint typically identifies a minimum amount of memory that the system on which the workload is to be installed must have. Both requirements and recommendations can be specified (e.g., a minimum of 2 GB of memory is required, but 4 GB or more of memory should be used if possible).

Another example constraint of the workload is an amount of storage space (e.g., hard disk space, optical disk space, etc.). This constraint typically identifies a minimum amount of storage space that the system on which the workload is to be installed must have. Both requirements and recommendations can be specified (e.g., a minimum of 10 GB of storage space is required, but 15 GB or more of storage space should be used if possible).

Another example constraint of the workload is the hardware type or architecture. For example, particular types of CPUs, particular bus or memory speeds, particular co-processors, and so forth may be required and/or recommended.

Another example constraint of the workload is the type of storage available to the system. This constraint can specify performance and reliability characteristics of the storage (e.g., RAID 1 or RAID 5 is required). This constraint can also specify that access to particular systems or databases is required. Both requirements and recommendations can be specified (e.g., RAID 1 or RAID 5 is required, but RAID 5 should be used if possible).

Another example constraint of the workload is the schedule for the workload, referring to when the computing that is to be performed should be started and/or ended. Both requirements and recommendations can be specified (e.g., the computing must end by 6:00 am, but should end by 5:00 am if possible).

Another example constraint is the events that should trigger the deployment of the workload, referring to when the computing that is to be performed should be started and/or ended. For example, when the same workload is operating on several computing devices with tasks assigned to the individual devices and/or virtual machines by a load balancing device, a monitoring system may determine that the number of incoming requests is exceeding the aggregate capacity of the devices and/or virtual machines, and may send an event indicating that another instance of that workload should be deployed to help carry the load. By way of another example, when a running workload fails because of a software or hardware problem, a monitoring system may send an event that indicates that a replacement copy of that workload should be deployed.

The constraints may also include a combination of events and schedules. For example, a workload may be started by a schedule, and the constraints specify that the workload should be ended and removed from the computing device when processing is finished, as indicated by an event; however, if the processing is not completed when the "batch window closes" at 6:00 am, the workload should be paused and removed from the computing device, and restarted to continue processing when the next "batch window" opens at the following midnight.

These constraints of the workload can refer to constraints on the physical hardware of the virtual system and/or constraints on the virtual hardware of a virtual machine of the virtual system. The model of the workload identifies whether the constraints refer to physical hardware or virtual hardware. Typically, the constraints of the workload identify constraints of the virtual hardware, and these constraints can be compared to the constraints of the system to verify that a virtual machine having virtual hardware satisfying these constraints of the workload can be created. Alternatively, the constraints of the workload can be compared to the constraints of currently running virtual machines to verify that a virtual machine having virtual hardware satisfying these constraints of the workload exists. In another alternative, the constraints of the workload identify constraints of the physical hardware, and these constraints can be compared to the constraints of the system to verify that a computing device satisfying these constraints exists.

Additionally, the workload may have different constraints that apply for different types of deployment. For example, if the workload is deployed and started from a state where it is not previously running, a certain set of constraints apply, but if the workload is started after having been previously executing, paused and saved in a virtual machine image file, another set of constraints apply, and if the workload is to be moved from one computing device to another through a migration process, yet another set of constraints apply.

Additionally, a model of the system where the application is to be installed is built (act 304). This building process in act 304 is typically performed by an administrator of the system where the application is to be installed, although could alternatively be performed by others. This model is an SDM model of the system analogous to model 100 of FIG. 1, and includes one or more components. The model of the virtual system includes types and instances, and optionally configurations.

The system in act 304 can be referred to as a virtual system, although the virtual machine(s) onto which the application and the operating system of the workload are to be installed may not yet be created. As such, the system in act 304 describes the physical computing devices on which virtual machines may be created, and describes virtual machines that have already been created, but does not describe virtual machines that have not yet been created.

The system in act 304 could be a single computing device, or alternatively multiple computing devices. For example, if the application will be installed on a virtual machine of a computing device in a data center having a thousand computing devices, then the model of the system where the application is to be installed will include those thousand computing devices. By way of another example, if the application will be installed on a virtual machine of a home computer that is not coupled to any other computers, then the model of the system where the application is to be installed will include just that home computer.

It should also be noted that the exact nature of a computing device can vary, and that any of a wide variety of computing devices can be a system in act 304. For example, "hierarchical" computers can exist, such as a rack that can contain multiple chassis, each chassis can contain multiple blades, each blade can contain multiple motherboards, each motherboard can contain multiple processors, and each processor can contain multiple cores. Any of these components of such a hierarchical computer can be viewed as a computing device (e.g., the rack can be a computing device, each chassis can be a computing device, each blade can be a computing device, each motherboard can be a computing device, each processor can be a computing device, and/or each core can be a computing device).

The characteristics of each computing device in the hierarchy, and the characteristics of the containment, hosting and communications relationships among them, are typically significant for the placement of virtual machines on those computing devices. For example, the speed of the connection may determine how a workload can be deployed, and therefore a constraint in the workload model indicates that the workload cannot be deployed across several computing devices at a level in the hierarchy where the connection speed is too slow. By way of another example, while it may be possible to deploy a workload down to the level of a single core, it may not be desirable to do so because of unpredictable performance interactions between workloads on the cores within one processor, and in this case the workload model has constraints that the workload should not be deployed on a computing device below the level of a processor in the hierarchy, or below a level where certain performance guarantees can be met, which would be described in the model of the computing device. By way of yet another example, a particular constraint on the workload may specify the software licensing requirements for various types of deployment, where operating systems and applications would have different rules about the licenses required when deploying the workload on a processor, or on a blade with many processors, or across several blades. Under these types of constraints, a particular computing device may not have enough licenses to allow the workload to be deployed, even though it may have enough processing power, memory and storage.

Oftentimes, the model of the system built in act 304 will be generated by the system administrator prior to the workload being designed and the model of the workload being built in act 302. In such situations, the previously generated model can be accessed and need not be re-built in act 304.

Components in the model of the system built in act 304 will include constraint information pages. These constraint information pages include constraints for each component in the virtual system. Such constraint information pages can identify constraints for the corresponding component, and optionally constraints that should be satisfied by any application to be installed on the corresponding component. Both the constraints on the workload and the characteristics of the system may be time-series data, in addition to the possibly time-based nature of the deployment schedule. For example, if once started the workload requires only 1 CPU for half an hour, and then needs 4 CPUs for half an hour, this sequence of values can be represented in the constraints. Similarly, if a computing device has 8 CPUs, but 2 of them are assigned to a workload for 1 hour, and 4 of them are assigned to a workload for 3 hours, and after that no more work is assigned to the computing device, the number of available CPUs can be calculated as 2 CPUs for 1 hour, 4 CPUs for 2 hours after that, and 8 CPUs after that. This time series of available CPUs can be recorded in the characteristics page of the system model Based on the models built in acts 302 and 304, a logical deployment evaluation is performed (act 306). The logical deployment evaluation involves comparing the model of the workload (from act 302) to the model of the system (from act 304) to determine whether the application could be installed in the system. Typically, the application designer or system administrator will identify a particular class (or classes) of computing device on which he or she desires to install the application. Alternatively, the application may be compared to all classes of computing devices in the system.

The constraints and/or description information for the workload are compared to the constraints for that class of computing device to determine whether the workload satisfies the constraints of the class of computing device, and the constraints and/or description information for the class of computing device are compared to the constraints for the workload to determine whether the class of computing device satisfies the constraints of the workload. The constraints and description information for all components of the class of computing device, including any applications that are hosted by the class of computing device (e.g., an operating system as well as possibly other applications) are also accessed as part of the logical deployment evaluation. These constraints used in the logical deployment evaluation can include constraints that are flowed across relationships, as discussed above. These constraints used in the logical deployment evaluation can also include time-series based constraints, as discussed above. Accessing the constraints for the operating system and other applications allows verification that, if installed on a device of the class of computing device, settings made on the computing device for the workload would not conflict with current settings for other applications installed on the computing device. The verification can use the scheduled start time of the workload, and the time-series of constraints and system characteristics, and can verify that the time profile of resources available on the system satisfies the time profile of requirements of the workload. In embodiments in which a virtual machine is being installed onto which the application will be installed, the evaluation in act 306 includes evaluating that any constraints of the virtual machine are satisfied by the class of computing device in order to verify that the virtual machine can be installed on the class of computing device.

By way of example, a particular constraint on the class of computing device may indicate that a software firewall should always be running on the class of computing device. A description page associated with the workload would be accessed to verify that the workload does not require a software firewall to be deactivated.

By way of another example, a particular constraint on the workload may indicate that the computing device should have a minimum processor speed. A description page associated with the class of computing device (or the processor of the class of computing device) would be accessed to verify that the speed of the processor is at least the minimum processor speed. As discussed above, this processor speed could refer to the speed of the virtual processor of the virtual machine on which the workload would be installed, or the speed of the physical processor of the class of computing device on which the virtual machine is installed. Furthermore, the fractional parts of the physical processor may be allocated to each virtual machine, and each such fractional part serves as the virtual processor for the virtual machine to which the part is allocated. As a fractional part of the physical processor could not be allocated as a virtual processor with a faster speed than the physical processor, a check would be made to ensure that the speed of the physical processor satisfies the constraint. Furthermore, a check would also be made that the fractional part of the physical processor can be allocated to the virtual machine to create a virtual processor that satisfies the constraint. This check can be performed by checking a description page associated with the system, or by communicating a request or query to a virtual system management component as to whether it would be able to create such a virtual machine having a virtual processor satisfying the constraint. It is to be appreciated that such speeds of virtual processors can vary depending on the number of other virtual machines that are already running on the computing device, as the presence of such other virtual machines will affect the fractional part of the physical processor that can be allocated to the virtual machine.

By way of yet another example, a particular constraint on the workload may indicate that the computing of the workload should be performed between midnight and 4:00 am. A description page associated with the class of computing device would be accessed to verify that the computing device has sufficient processing capacity (in light of other workloads already scheduled to be performed between midnight and 4:00 am) to have a new virtual machine (or alternatively an existing virtual machine) perform the computing of the workload.

It should be noted that, depending on the manner in which virtual machines are created and managed, it may be possible for a class of computing device to "overcommit" its resources. For example, three different virtual machines may each require 4 GB of memory, but a particular class of computing device may only have 8 GB of memory. In such situations, all three virtual machines could be run on that class of computing device by running only two of the three virtual machines concurrently, or all three virtual machines could be run simultaneously (on the assumption that the workloads will on the average share some memory pages that are used for read-only access). By way of another example, two different virtual machines may each require 100 GB of storage space, but a particular class of computing device may only have 160 GB of storage space. In such situations, both virtual machines could be run on that class of computing device by running the two virtual machines at separate times, or both virtual machines could be run simultaneously (on the assumption that they will not both make full demands on the storage space at the same time). The models of the workloads indicate whether such overcommitment is possible and whether it is desirable.

It should also be noted that whatever components are referenced by constraints in the SDM are evaluated in act 306, regardless of what those components are. Typically, constraints of the class of computing device are evaluated in act 306 down to the layer that is hosting the workload being installed, but may extend to other layers if referenced in the SDM. By way of example, assume that a virtual machine is being provisioned on a computing device, and a workload is being provisioned on the virtual machine. Typically, constraints of the virtual machine would be evaluated against the computing device and the operating system running on the computing device, while constraints of the workload would be evaluated against the virtual machine. However, if the workload had a constraint referencing the computing device itself (e.g., regarding physical protection of the computing device on which the workload is deployed), then that constraint of the workload would be evaluated against the computing device.

The results of the evaluation in act 306 can be returned to the workload designer and/or system administrator. An indication of success (if all of the constraints are satisfied) or failure (if all of the constraints are not satisfied) can be returned. In addition, if one or more of the constraints are not satisfied, then an indication of which constraint was not satisfied can be returned, as well as optionally an indication of which component caused the constraint to not be satisfied. Optionally, the evaluation can indicate whether the constraints that were not satisfied were mandatory or recommended constraints. Returning such information can assist the workload developer in modifying the workload so that it can be installed in the system, and in choosing which of the available systems would be most suited for the workload.

Process 300 then proceeds based on the results of the evaluation in act 306. If the evaluation indicates that the workload can be installed in the system, then process 300 can proceed to act 308. Act 306 may also optionally be repeated for a different class of computing device in the system. However, if the evaluation indicates that the workload cannot be installed in the system, then the evaluation of act 306 can be repeated for a different class of computing device in the virtual system, or alternatively the workload may be modified in order to overcome the problem(s) identified in the evaluation of act 306, and process 300 can return to act 302 to build a model of the modified workload. If time-series based constraints are not met by the system, and if the scheduled start time is specified as a recommended rather than required start time, the verification can evaluate whether the constraints can be met by a later or earlier start time and can return a list of possible classes of computing devices with the possible start time for each one.

In act 308, physical deployment of the workload is determined. Determining physical deployment of the workload refers to identifying which particular computing device(s) will perform the computing of the workload (and optionally have a new virtual machine created thereon to perform the computing of the workload). The particular computing device(s) which will perform the computing of the workload can be identified in different manners. One way in which the particular computing device(s) will perform the computing of the workload can be identified is manually, such as by a system administrator or other party manually selecting a particular computing device(s). This manually selected computing device(s) could be a computing device already(s) in the system, or alternatively a new computing device(s) that needs to be purchased or a computing device(s) that needs to be removed from storage and added to the system (e.g., coupled to the network that the other computing devices in the system are coupled to).

Alternatively, the particular computing device(s) which will perform the computing of the workload can be identified automatically. An application running in the system can identify various characteristics of the computing devices on which a virtual machine could be created and the workload installed thereon (e.g., the computing devices of the particular class of computing device on which the application is to be installed), such as load characteristics of each computing device. The load characteristics could identify, for example, the average or maximum amount of processor usage, the average amount of memory usage, the amount of available network bandwidth being used, the amount of hard disk drive space being used, and so forth. Based on these load characteristics, the computing device(s) most likely to be able to support the new virtual machine and the workload would be identified as the computing device(s) on which the computing of the workload is to be performed (e.g., the computing device having the lightest load, such as the lowest average processor usage, the smallest amount of available network bandwidth being used, the most hard disk drive space available, and so forth). If no computing device can meet the recommended schedule, but several can meet the required schedule, the computing device that comes closest to meeting the recommended schedule could be identified.

It should be noted that typically a new virtual machine is created as part of installing the workload. Thus, the characteristics of the computing devices are evaluated for purposes of determining which computing device(s) will have the new virtual machine created thereon and will perform the computing of the workload. Alternatively, a new virtual machine may not be created, and the workload may be installed on an already running virtual machine. In such situations, the characteristics of the currently running virtual machines are evaluated for purposes of determining which virtual machine(s) will perform the computing of the workload.

Alternatively, the particular computing device(s) which will perform the computing of the workload can be identified in a semi-automatic manner. An application running in the system can identify various characteristics of the computing devices on which the virtual machine could possibly be created and the computing of the workload could possibly be performed (or characteristics of the virtual machines on which the workload could possibly be performed) analogous to the automatic manner, and then present those results to a user (such as the system administrator) for manual selection of one or more of the computing devices (or virtual machines). One or more of the computing devices may optionally be recommended to the user as the best candidate(s) for selection, but the ultimate selection would remain at the user's discretion.

Additionally, priorities of different workloads may be used as part of the physical deployment determining of act 308. Workloads can optionally be assigned priorities, allowing the importance of the workloads relative to one another to be identified. These priorities are typically included in the model of the workload or the workload itself, but alternatively may be maintained elsewhere. Higher priority workloads can be given access to resources of the virtual system before lower priority workloads. This can result in situations where, for example, higher priority workloads can be performed by a computing device(s), but there are insufficient resources for lower priority workloads to be performed. This can also result in situations where, for example, higher priority workloads are given the resources recommended by the constraints of the workload, whereas lower priority workloads are given only the resources required by the constraints of the workload.

In addition, selection of different sources of data and/or other systems to which access is needed may be performed as part of the physical deployment determining of act 308. For example, multiple sources may exist from which data identified as being required in the model of the workload can be obtained, or multiple replicated file servers may exist that can be a file server identified as being required in the model of the workload. Particular sources of data and/or other systems to which access is needed may be selected in act 308 based on various factors, such as the load on the various sources and/or other systems, the bandwidth of the connection to those sources and/or systems, and so forth. Alternatively, rather than being performed as part of act 308, selection of such sources of data and/or other systems to which access is needed may be performed as part of the physical deployment in act 312 discussed below.

It should be noted that one additional factor that can be optionally taken into account when identifying the characteristics of the various computing devices is that virtual machines can be rearranged to run on different computing devices. For example, a virtual machine running on one computing device could be moved to another computing device, thereby freeing up capacity on the original computing device. Such a process of moving or rearranging virtual machines is also referred to as migration of the virtual machines. Virtual machines can be migrated in any of a variety of manners, such as with the assistance of the Virtual Server Migration Toolkit (VSMT) available from Microsoft Corporation of Redmond, Wash.

Accounting for the possibility of migrating virtual machines allows the load characteristics of the computing devices to be changed by migrating the virtual machines. For example, the situation may arise where none of the computing devices have the desired spare capacity to create a virtual machine on which the application could be installed, but that capacity of one of the computing devices could be released by moving a virtual machine from that one computing device to another of the computing devices. After the virtual machine is moved, however, the released capacity results in that one computing device having sufficient capacity so that the new virtual machine on which the application is to be installed can be created and the application installed on that new virtual machine.

This identification of which computing device should perform the computing of the workload, and optionally which virtual machines should be migrated to different computing devices, is performed as part of the physical deployment determining of act 308.

A workload installation specification for physical deployment of the workload is then generated (act 310). The workload installation specification can be saved as an installation page associated with the component representing the workload in the workload model. The workload installation specification includes an identification, for each class of device in the virtual system on which the workload may be installed, of how to install the workload. As each of these identifications indicates how to install the workload on a particular class of devices, these identifications can also be referred to as device class installation specifications. The device class installation specifications can also identify which particular computing device(s) of that class the workload is to be installed on (the computing device(s) determined in act 308).

This identification of how to install the workload includes, for example, all of the settings for the virtual machine to be created on the device, the operating system to install on the virtual machine (including all of the settings of the operating system and the identification of all of the files that need to be copied to the virtual machine to install the operating system), all of the settings of the computing device that should be made or changed, an identification of all of the files that need to be copied to the computing device and where those files should be copied, an order in which files should be copied and/or settings made or changed, any initialization programs that need to be run after the files have been copied and/or settings made or changed, and so forth. This identification may also include installing an operating system and/or one or more additional applications on the computing device prior to creating the virtual machine on the device. For example, one class of computing device may be a bare computing device with no operating system installed on it. In such situations, the installation specification for that class of computing device would include initially installing the appropriate operating system on the computing device, followed by creating the virtual machine on the computing device, then installing an operating system on the virtual machine, and then installing the application on that operating system of the virtual machine.

In certain implementations, this identification of how to install the workload identifies a particular image file that is the image to be run to perform the computing of the workload. The image file can be created as part of the process of building the model of the workload in act 302, or alternatively can be created at other times (e.g., after the logical deployment evaluation has been performed in act 306). The image file includes the application files and data, and optionally the files and data for the operating system on which the application will be executed, for the workload. The image file can be copied to a disk drive or other storage device and executed by a virtual machine to perform the computing of the workload—no additional installation or configuration of the operating system or the application of the workload is typically required. The image file can be generated in any of a variety of conventional manners, such as by installing the application and operating system onto a virtual machine and generating a file that includes all the folders and files installed onto that virtual machine, by a user (e.g., the designer of the workload) manually identifying the folders and files to be included in the image file, and so forth. The image file can then be simply copied to the computing device(s) as part of the physical deployment in act 312 discussed below.

Additionally, if any migration of virtual machines is to be performed for a particular class of device, as identified in act 308, then the device class installation specification for that class of device includes an indication of the migration that is to be performed and the constraints that must be met for that type of migration.

At least a portion of each device class installation specification can be generated automatically based on the information contained in the information pages associated with the workload to be installed. As discussed above, the constraint information page can include various default values. These default values can be used during act 310 to identify the settings or configuration values that should be set when installing the workload, and thus which should be included in the device class installation specification. For example, a particular default value may be included in the configuration information page for a buffer size. This default value would be included in the device class installation specification so that when the workload is installed on a particular computing device, the computing device settings (such as in an operating system registry) can be modified to include this default value for the buffer size (possibly replacing another value for the buffer size previously stored in the computing device settings).

In addition to default values, other constraint information included in the constraint information page can be used in act 310 to identify the settings or configuration values that should be set when installing the workload. If a range of values for a particular setting were included in the constraint information page, then a setting to be used when installing the application can be derived from that range. For example, the lowest value in the range could be selected, the highest value in the range could be selected, the average of the highest and lowest values in the range could be computed and selected, a value in the range could be selected randomly, and so forth.

Furthermore, in addition to information contained in the information pages associated with the workload, information contained in the information pages associated with the virtual system (such as the computing device on which the application is to be installed) can be used as a basis for automatically generating at least a portion of each device class installation specification. Default values and/or ranges of values can be used to automatically generate values for the device class installation specification in the same manner as discussed above.

It should also be noted that different components can have different constraints and different default values for the same settings or configuration values. In such situations, even though there is overlap of the constraints so that the different components can all be installed on a computing device, one or more of the default values may violate the constraints of another component. Thus, a suitable value that is compliant with the constraints of all of the components is determined. This suitable value can be determined in different manners, including manually, automatically, and semi-automatically. A suitable value can be determined manually by a user (such as the system administrator) inputting a suitable value for the setting or configuration value.

A suitable value can be determined automatically by evaluating the various constraints and selecting a value that satisfies all the constraints. This selected value is then used as the suitable value. For example, if each constraint lists a range of acceptable values, then a value that falls within each range of acceptable values can be automatically identified and used as the suitable value.

A suitable value can be determined semi-automatically by evaluating the various constraints and selecting a value that satisfies all the constraints analogous to the automatic manner. However, rather than automatically using the selected value as the suitable value, the selected value can be presented to a user (such as the system administrator) for approval. The user can accept this selected value, or alternatively input a different value. Alternatively, rather than presenting a single selected value to the user, the range of possible values (or portion of the range of possible values) that satisfies the constraints of the different components may be presented to the user.

It should further be noted that at least a portion of a device class installation specification may be generated manually rather than automatically. This manual generation refers to user inputs (such as by the application developer or system administrator) rather than automatic generation by some component or module (e.g., development module 400 discussed below). For example, the particular files to be identified in the device class installation specification may be identified manually rather than automatically.

Additionally, an assignment record is generated in act 310 that maintains a record of which device class installation specifications are to be used for which device classes. This record can be, for example, a mapping of device class to device class installation specification. Thus, given the workload installation specification including multiple device class installation specifications, a determination as to which particular device class installation specification to use can be made based on the class of the device on which the workload is to be installed. The assignment record generated can also be stored as part of the workload installation specification.

Alternatively, rather than having a separate assignment record, an identification of which device class installation specification is associated with which particular class of device may be maintained in other manners. For example, the indication may be inherent in the naming convention used for the device class installation specification (e.g., each device class installation specification may be a separate file having a file name that identifies the particular class of device), or each device class installation specification may include an indication of the associated class of device.

The workload installation specification is generated after the logical deployment evaluation in act 306. Thus, the application installation specification is generated only after it is verified that the workload can be installed in the system. Additionally, the constraint information (such as default values) associated with the workload can be used to determine settings to be included in the workload installation specification. Thus, it can be seen that the workload installation specification generated in act 310 is derived at least in part from the model of the workload as well as the model of the system.

After the workload installation specification is created, physical deployment of the workload is performed (act 312). The timing of the physical deployment can vary. Deployment may be triggered manually, such as by a user (such as the system administrator) specifying that deployment should begin "now" or at a particular time in the future. Deployment may also be triggered based on other events and/or schedules identified in the workload as discussed above.

In certain implementations, this physical deployment includes making the workload installation specification available to a deployment system and having the deployment system create a new virtual machine on the particular device identified in act 308, and also copy the image file identified by the workload on the particular device identified in act 308 for execution by the newly created virtual machine. In other implementations, this physical deployment includes making the workload installation specification available to a deployment system and having the deployment system create a new virtual machine on the particular device identified in act 308 and install the application on that new virtual machine following the installation instructions in the workload installation specification.

Once the deployment system is given the workload installation specification, the deployment system operates in a conventional manner to install the workload. If the application installation specification indicates that migration of any virtual machines is to be performed, then this migration can also be carried out by the deployment system (optionally with the assistance of another component, such as the Virtual Server Migration Toolkit discussed above). Any of a variety of deployment systems could be used in act 312, such as the Windows® Installer service or Microsoft® Systems Management Server, both available from Microsoft Corporation of Redmond, Wash.

Once the workload is installed on a computing device, the new virtual machine and the application installed thereon becomes part of the system and thus the workload model is incorporated into the system model and a component for the new virtual machine (as well as the operating system for the new virtual machine, and any other components running on the virtual machine) is added to the system model. Thus, after installation of the application, the SDM for the system includes the SDM of the workload. This includes modifying characteristics of the system such as available number of CPUs, which might be time-series based to reflect the allocation of CPUs to scheduled workloads and the time-series based requirements of CPUs of those workloads.

Alternatively, the evaluation in act 306 may be for a particular computing device or virtual machine rather than for a class of computing device. In this alternative, the evaluation in act 306 is the same as discussed above, except that constraint and description information for a particular instance of a computing device are used rather than constraint and description information for a class of computing device. In such situations, the identification of the particular computing device is made in, or prior to, act 306 rather than in act 308, and can be made in the same manner as discussed in act 308.

It should also be noted that a particular device class installation specification may indicate to install the whole workload or individual components of the workload on multiple different computing devices within the system. For example, the workload developer or system administrator may desire to install the workload on all of the computing devices of a particular class. By way of another example, the workload developer or system administrator may desire to install each part of the workload on a computing device of a specific class. In such a situation, an indication is included in the device class installation specification for that particular device class that the workload is to be installed on all of the computing devices of that particular class, or alternatively may identify the particular computing devices (e.g., by name or other unique identifier) on which the workload is to be installed. The installation instructions may also identify the sequence in which the parts of the workload are to be installed on each system, and how to coordinate the installation steps by waiting for the completion of one step before proceeding with the next, using conventional orchestration technologies. The deployment system used to install the workload receives this indication and installs the workload on the appropriate computing devices.

Figure 4:
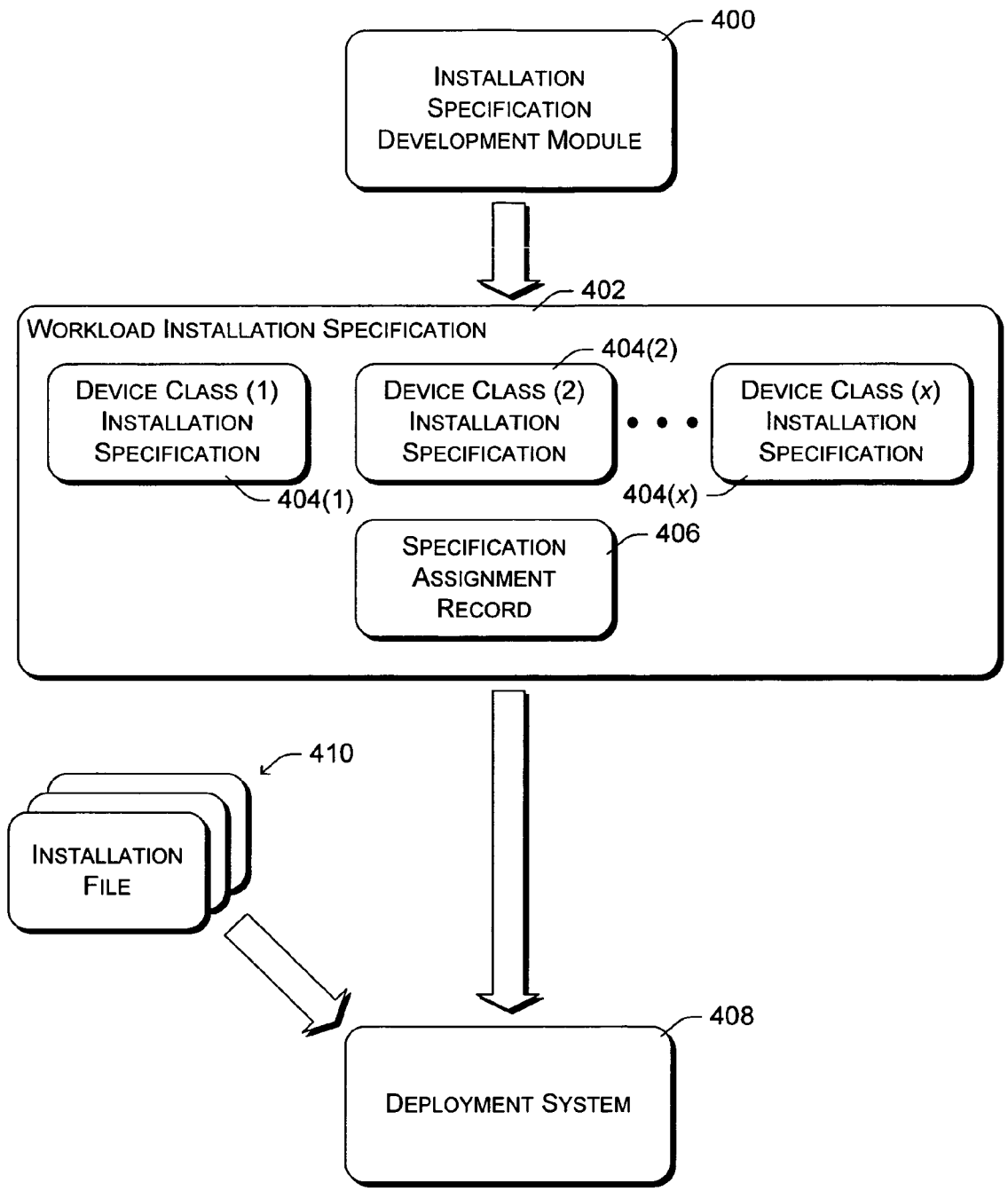
FIG. 4 illustrates an example workload installation specification in additional detail.

FIG. 4 illustrates an example workload installation specification in additional detail. An installation specification development module 400 generates a workload installation specification 402. Installation specification module 400 can be implemented in software, firmware, hardware, or combinations thereof, and can perform act 310 of FIG. 3, and optionally additional acts of FIG. 3 (such as act 306 and/or act 308). Workload installation specification 402 includes multiple (x) device class installation specifications 404(1), 404(2), . . . 404(x). Each of the device class installation specifications 404 identifies how the workload is to be installed on a particular class of computing device. Workload installation specification 402 also includes specification assignment record 406 to identify which specification 404 corresponds to which class of computing device.

Workload installation specification 402 is input to a deployment system 408 along with any necessary installation file(s) 410. Installation file(s) 410 include the file(s) that are to be installed on the computing device in order to install the application, such as one or more files of executable code, one or more files of data, an image file, and so forth. Alternatively, although illustrated separately, workload installation specification 402 and installation file(s) 410 may be stored together in a single package (e.g., a compressed file).

Figure 5:
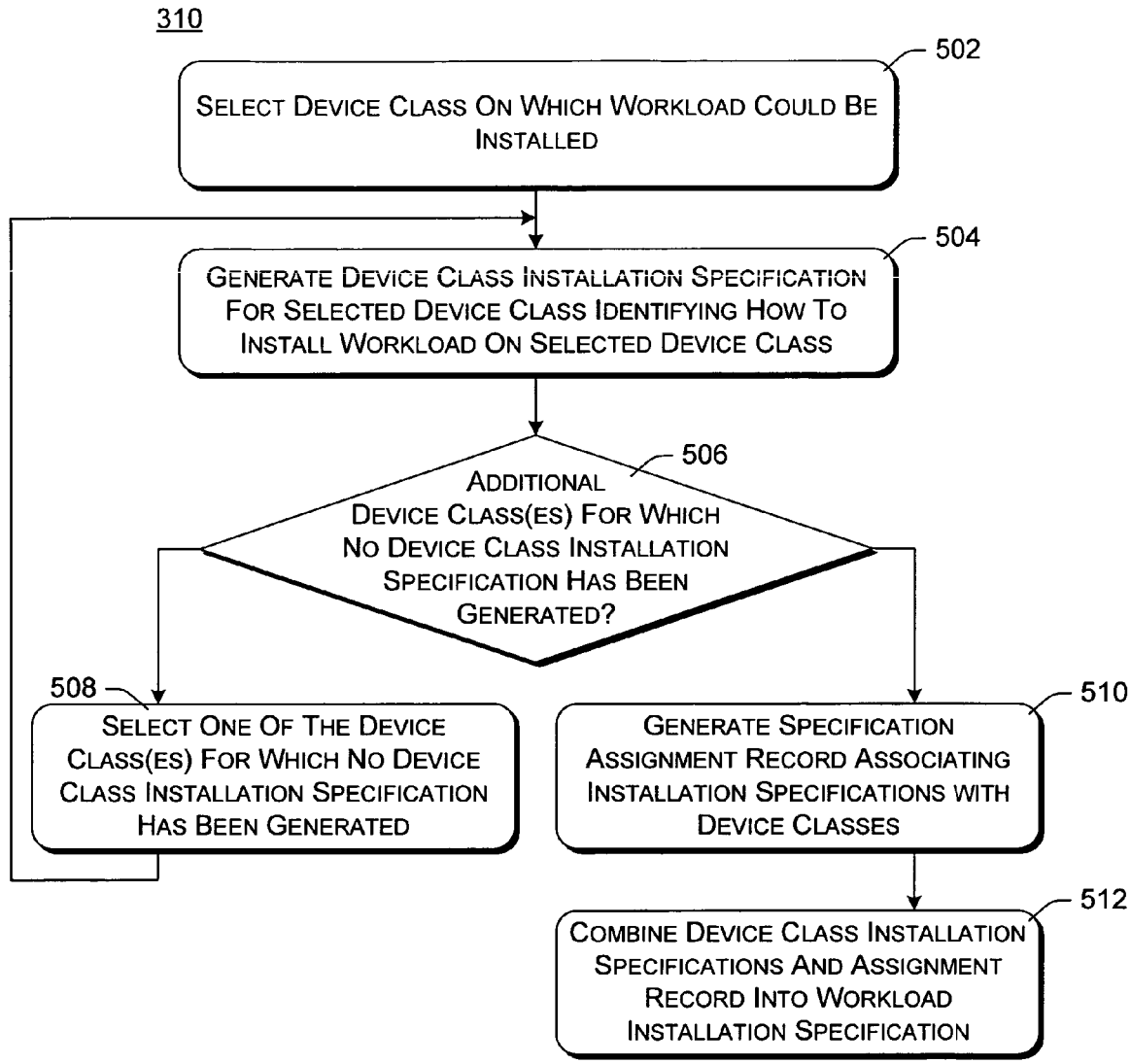
FIG. 5 is a flowchart illustrating an example of the generation of a workload installation specification for physical deployment in additional detail.

FIG. 5 is a flowchart illustrating the generation of a workload installation specification for physical deployment of act 310 of FIG. 3 in additional detail. FIG. 5 can be implemented in software, firmware, and/or hardware.

Initially, a device class on which the workload could be installed is selected (act 502). In certain embodiments the system administrator and/or workload developer (or alternatively some other party) may desire that the workload be installed only on certain classes of devices, in which case the devices on which the workload could be installed is less than all of the devices in the system. Alternatively, the workload may be able to be installed on any device in the system.

A device class installation specification for the selected device class is then generated, identifying how to install the workload and virtual machine on the selected device class (act 504). As discussed above, this generation can include using default values included in an information page associated with the workload in the workload model for setting values to include in the installation specification being generated.

In some situations, the device class installation specification is generated in a format that is expected and understood by a deployment system that will be installing the workload and the virtual machine. The device class installation specification may be generated in this format in act 504, or alternatively may be subsequently translated into this format (e.g., by a translation component of the distribution system).

It should be noted that different device installation specifications may be generated for computing devices that will have the same functionality but are currently configured differently, such as computing devices that do not yet have an operating system installed and computing devices that already have an operating system installed. Alternatively, such computing devices may be considered to be part of the same device class, but the device class installation specification would include a conditional portion to be used based on the configuration of the particular instance of the computing device on which the application is being installed (e.g., the conditional portion may be bypassed if the computing device already has an installed operating system, or used to install an operating system on the computing device if an operating system is not already installed on the computing device).

A check is then made as to whether there are any additional device class(es) in the virtual system for which no device class installation specification has been generated (act 506). If there are any such additional device class(es), then one such additional device class is selected (act 508) and the process returns to act 504 to generate a device class installation specification for the selected device class.

Returning to act 506, if device class installation specifications have been generated for all of the device class(es), then a specification assignment record is generated associating particular installation specifications with particular device classes (act 510). Alternatively, the specification assignment record may be generated in act 504 as the device class installation specifications are being generated, and an indication of which device class is associated with which device class installation specification added to the specification assignment record as the device class installation specification is generated.

The device class installation specifications generated in act 504 and the assignment record generated in act 510 are then combined into a workload installation specification for the application (act 512).

Figure 6:
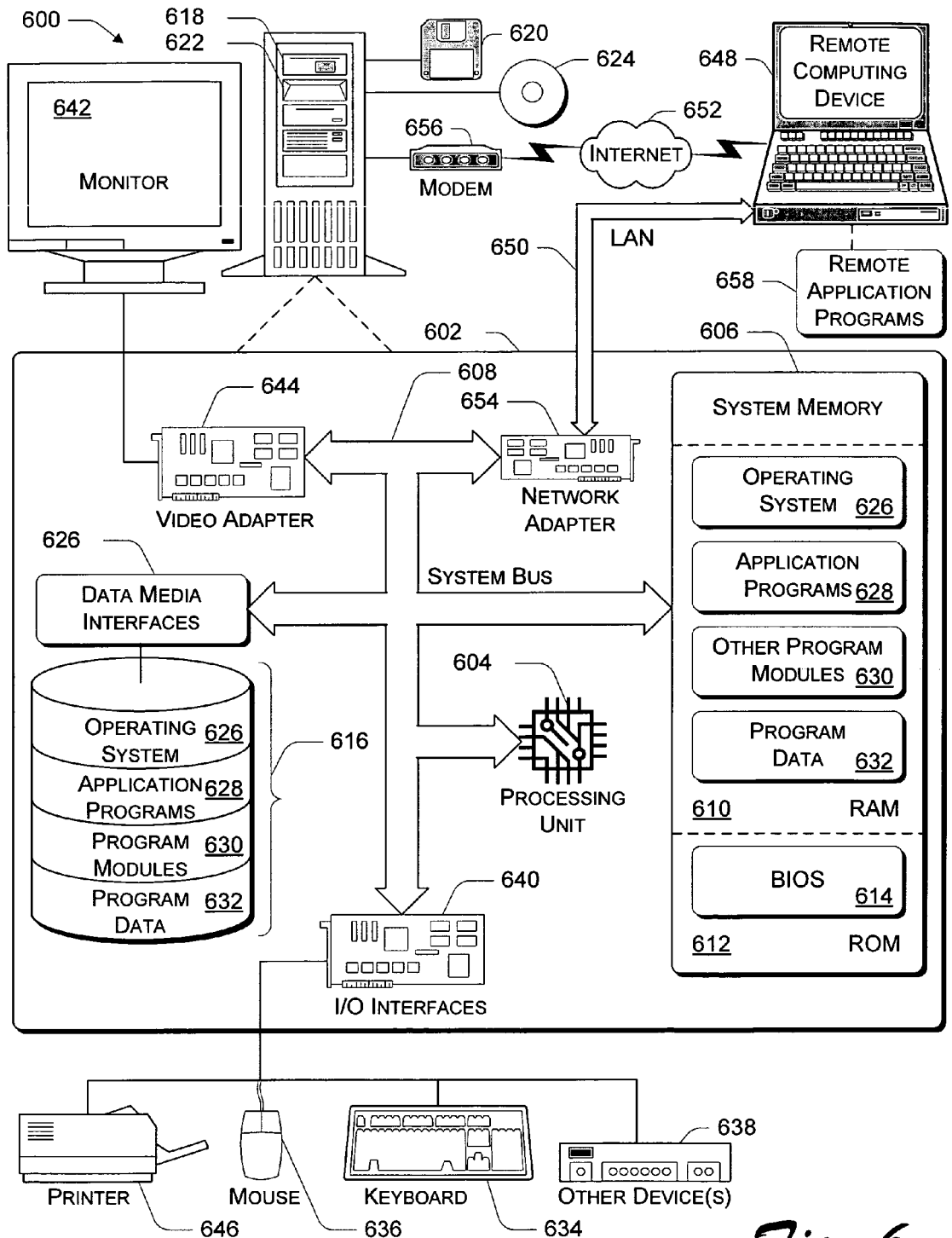
FIG. 6 illustrates an example general computer environment, which can be used to implement the techniques described herein.

FIG. 6 illustrates an example general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. Computer 602 can be, for example, a computing device on which an application is installed or a computing device on which at least portions of process 300 of FIG. 3 are implemented. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   accessing a model of a workload to be installed on a virtual machine of a system wherein the workload includes an application and an operating system to be installed on the virtual machine, the model of the workload comprising a component that identifies a source of the application and a component that identifies the source of the operating system of the workload and the model identifying the relationship between the operating system and the application by identifying a corresponding relationship between components in the workload model;
   accessing a model of the system wherein the virtual machine is to be created on a computing device to provide virtualized components of the system, the virtual machine emulates a computing environment that is compatible with the operating system and has the characteristics required to allow the application to run, the model of the system comprising components corresponding to the virtualized components of the system, the model identifying relationships among the virtualized components by identifying a corresponding relationship among the components of the model; and
   generating an installation specification for the workload, the installation specification being derived at least in part from the model of the workload and the model of the system, wherein the installation specification identifies an image file of the workload that is to be copied to a storage device of a computing device of the system on which the virtual machine is created in order to install the workload on the virtual machine.

2. A method as recited in claim 1, having a virtual machine created on a computing device of the system prior to installing an application and operating system on the virtual machine.

3. A method as recited in claim 1, wherein the installation specification includes an indication to migrate another virtual machine from one computing device to another computing device.

4. A method as recited in claim 1, further comprising:
   generating a plurality of device class installation specifications for the workload, each of the plurality of device class installation specifications being for a different one of a plurality of classes of devices in the system on which the workload could be installed.

5. A method as recited in claim 4, further comprising:
   generating a record associating each of the plurality of device class installation specifications with one of the plurality of classes of devices.

6. A method as recited in claim 1, further comprising:
   performing, prior to generating the installation specification, a logical deployment evaluation to determine whether the workload could be installed in the system, the performing comprising comparing constraints associated with the workload to constraints associated with the system.

7. A method as recited in claim 6, wherein the constraints associated with the workload include software licensing requirements that must be satisfied by the system.

8. A method as recited in claim 1, further comprising:
   identifying, prior to generating the installation specification, which one or more computing devices of a plurality of computing devices in the system is to have the workload installed thereon.

9. One or more computer readable storage media having stored thereon a plurality of instructions that, when executed by one or more processors, causes the one or more processors to:
   access a model of a workload to be installed on one or more virtual machines of a system, the workload includes an application and an operating system to be installed on the virtual machine, the model of the workload comprising components corresponding to the application and the operating system to be installed and identifying the relationship between the operating system and the application by identifying a corresponding relationship between components in the workload model;
   access a model of the system wherein the one or more virtual machines are to be created on a computing device to provide virtualized components of the system wherein the virtual machine emulates a computing environment that is compatible with the operating system and has the characteristics required to allow the application to run, the model of the system comprising components corresponding to the virtualized components of the system, the model identifying relationships among the virtualized components by identifying a corresponding relationship among the components of the model; and
   generate a workload installation specification for the workload to be installed on one or more virtual machines of a system, the workload installation specification being based at least in part on the model of the workload and the model of the system.

10. One or more computer readable media as recited in claim 9, wherein the installation specification identifies an image file of the workload that is to be copied to a storage device of one or more computing devices of the system on which the one or more virtual machines are created in order to install the workload on the one or more virtual machines.

11. One or more computer readable media as recited in claim 9, wherein the plurality of instructions further cause the one or more processors to:

trigger deployment of the workload based on one or more constraints in the model of the workload.

12. One or more computer readable media as recited in claim 9, wherein the plurality of instructions further cause the one or more processors to:

generate a plurality of device class installation specifications for the workload, each of the plurality of device class installation specifications being for a different one of a plurality of classes of devices on which the workload could be installed; and include the plurality of device class installation specifications in the workload installation specification.

13. One or more computer readable media as recited in claim 9, wherein to generate the workload installation specification is to:

access a constraint information page in the model of the workload;

obtain default values for settings from the constraint information page; and include, in the workload installation specification, the default values to be stored as settings on the one or more computing devices during installation of the workload on the one or more computing devices.

14. A computing device comprising:

a processor; and a memory, coupled to the processor, to store instructions that, when executed by the processor, cause the processor to:

access a model of a workload to be installed on a virtual machine of a system, the model of the workload comprising components corresponding to components to be installed on the virtual machine, including at least an operating system and an application, and identifying the relationship between the components to be installed on the virtual machine by identifying a corresponding relationship between components in the workload model;

access a model of the system wherein the model of the computing components of the system is different from the computing components of a computing device on which the virtual machine is installed wherein the virtual machine emulates a computing environment that is compatible with the operating system and has the characteristics required to allow the application to run, the model of the system comprising components corresponding to the virtualized components of the system, the model identifying relationships among the virtualized components by identifying a corresponding relationship among the components of the model; and generate an installation specification for the workload, the installation specification being derived at least in part from the model of the workload and the model of the system.

15. A computing device as recited in claim 14, wherein the virtual machine is to be installed on a computing device of the system prior to installing an application and operating system of the workload on the virtual machine.

16. A computing device as recited in claim 14, further comprising:

generating a plurality of device class installation specifications for the workload, each of the plurality of device class installation specifications being for a different one of a plurality of classes of devices in the system on which the workload could be installed.

17. A computing device as recited in claim 14, wherein the generating comprises:

accessing a constraint information page in the model of the workload;

obtaining default values for settings from the constraint information page; and including, in the installation specification, the default values to be stored as settings on a computing device of the system during installation of the workload on the computing device.

* * * * *